United States Patent
Koshima et al.

(10) Patent No.: US 6,349,211 B2
(45) Date of Patent: Feb. 19, 2002

(54) POSITION DISPLAY SYSTEM OF MOBILE TERMINAL

(75) Inventors: Hiroaki Koshima; Katsuhiko Kumamoto; Kimio Muya; Hiroyuki Kurokawa; Ryuichi Iwagami, all of Osaka (JP)

(73) Assignee: Ace K Computer Co., Ltd., Osaka (JP)

(*) Notice: Subject to any disclaimer, the term of this patent is extended or adjusted under 35 U.S.C. 154(b) by 0 days.

(21) Appl. No.: 09/885,063

(22) Filed: Jun. 21, 2001

Related U.S. Application Data

(62) Division of application No. 08/809,605, filed as application No. PCT/JP96/02088 on Jul. 25, 1996.

(30) Foreign Application Priority Data

| Jul. 25, 1995 | (JP) | 7-221002 |
| Oct. 16, 1995 | (JP) | 7-303283 |
| Dec. 13, 1995 | (JP) | 7-324317 |
| Jun. 17, 1996 | (JP) | 8-155435 |

(51) Int. Cl.$^7$ ............................................. H04B 7/00
(52) U.S. Cl. ........................................................... 455/457
(58) Field of Search ................................. 455/422, 426, 455/450, 458, 456, 457, 550, 575, 226.1, 226.2; 342/450, 457, 458

(56) References Cited

U.S. PATENT DOCUMENTS

| 4,701,760 A | 10/1987 | Raoux |
| 4,799,062 A | 1/1989 | Sanderford, Jr., et al. |
| 5,280,295 A | 1/1994 | Kelley et al. |
| 5,293,642 A | 3/1994 | Lo |
| 5,299,132 A | 3/1994 | Wortham |
| 5,327,144 A | 7/1994 | Stilp et al. |
| 5,386,588 A | 1/1995 | Yasuda |
| 5,408,679 A | 4/1995 | Masuda |
| 5,483,244 A | 1/1996 | Grube et al. |
| 5,508,707 A | 4/1996 | LeBlanc et al. |

FOREIGN PATENT DOCUMENTS

| EP | 0 126 557 A1 | 11/1984 |
| EP | 0290725 | 11/1988 |
| JP | 62-226649 | 10/1987 |
| JP | 63-195800 | 8/1988 |
| JP | 64-71226 | 3/1989 |
| JP | 2-44929 | 2/1990 |
| JP | 02044929 | 2/1990 |

(List continued on next page.)

OTHER PUBLICATIONS

"Basics of Mobile Transmission", by Okumura et al., The Institute of Electronics, Information and Communication Engineers, Jun. 10, 1987, pp. 25–27.

Thom Frühwirth et al., "Planning Cordless Business Communication Systems", AI in Telecommunications, IEEE Expert, vol. 1, No. 1, Feb. 1996, pp. 50–55, XP000585053.

Primary Examiner—Thanh Cong Le
(74) Attorney, Agent, or Firm—McDermott, Will & Emery

(57) ABSTRACT

A position detection system of a mobile terminal includes a small zone communication system (50) such as the PHS system, and a center station (1) connected to an exchange station (2) forming the PHS system. When a call is dispatched from the center station to the telephone number of a mobile station 7 of which the position is to be identified, the call signal is transmitted to a repeater (6) located closest to the mobile station (7) via exchange stations (2, 4) and main lines (3, 5) forming the PHS system (50). Since the mobile station (7) can identify the identification number of the closest repeater (6), the position of repeater (6) can be identified by referring to the database of the PHS system (50) using the repeater database provided in a center control station (51). The position can be displayed on a CRT screen at the center station (1) side. A position detection apparatus of a mobile terminal that can detect a position at low cost and at high accuracy is provided.

1 Claim, 27 Drawing Sheets

FOREIGN PATENT DOCUMENTS

| | | |
|---|---|---|
| JP | 3-45030 | 2/1991 |
| JP | 5-41687 | 2/1993 |
| JP | 5-83191 | 4/1993 |
| JP | 5-99168 | 4/1993 |
| JP | 6-501347 | 2/1994 |
| JP | 6-152503 A | 5/1994 |
| JP | 6-276142 | 9/1994 |
| JP | 6-334595 | 12/1994 |
| JP | 07087554 | 3/1995 |
| JP | 7-231473 | 8/1995 |
| NZ | 247865 | 7/1995 |
| WO | 92/02105 | 2/1992 |
| WO | 96/04155 | 2/1996 |

FIG. 16a
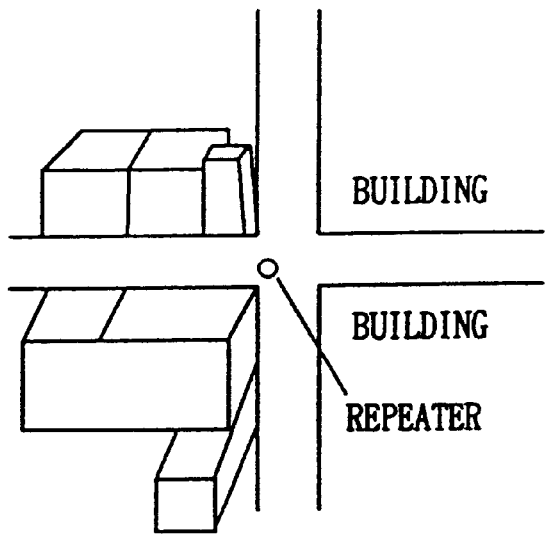 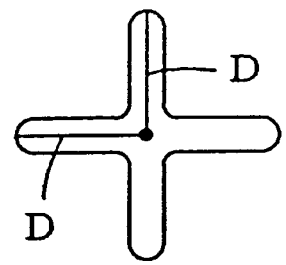
FIG. 16b
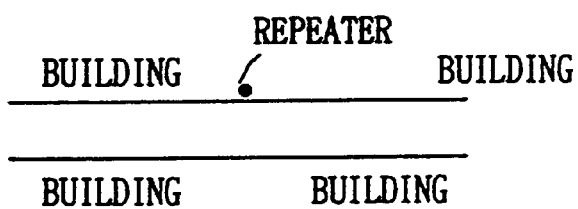 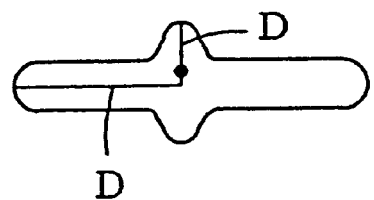
FIG. 16c
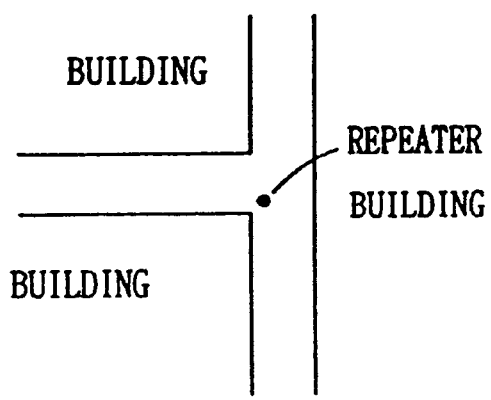 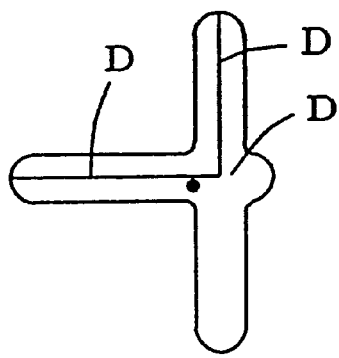

FIG. 25

| ACCURACY | DISTANCE RANGE PER 1 BYTE |
|---|---|
| 1 m | 256 m |
| 2 m | 512 m |
| 4 m | 1024 m |

FIG. 26

| ANGULAR INTERVAL OF TRAIN OF COORDINATE POINTS | DATA LENGTH OF WAVE PROPAGATION PATTERN | DATA LENGTH IN TRAIN OF COORDINATE POINTS(WHEN FLOATING POINT 8 BYTES) |
|---|---|---|
| 1 DEGREES | 360 BYTES | 5760 BYTES |
| 2 DEGREES | 180 BYTES | 2880 BYTES |
| 5 DEGREES | 72 BYTES | 1152 BYTES |

POSITION DISPLAY SYSTEM OF MOBILE TERMINAL

This application is a division of 08/809,605 filed Mar. 19, 1997 which is 9 371 of PCT/JP96/02088 filed Jul. 25, 1996.

BACKGROUND OF THE INVENTION

1. Field of the Invention

The present invention relates to a position display system of a mobile terminal, a center station therefor, and a mobile terminal thereof. Particularly, the present invention relates to a position display apparatus of a mobile terminal employing a small zone communication system, a system therefor, and a mobile terminal thereof.

2. Description of the Background Art

A method of detecting the position of a mobile of interest to the present invention is disclosed in Japanese Patent Publication No. 6-93650, for example. According to the present publication, waves from a plurality of repeaters are received at respective mobiles in a mobile communication system for carrying out communication between a repeater and a mobile via a wave. By using a coverage contour of a reception electric field level from each repeater obtained in advance, the range in which a mobile can be located corresponding to each reception level is obtained to detect the current position of a mobile from the overlap of each range.

However, it is difficult to draw the coverage contour in the frequency range used for a general mobile wireless telephone system and, therefore, it is not practical. The reason is that when an intensity of the electric field is to be measured, the fixed value is seldom obtained due to the fact that the electric field value changes depending on the time elapsed and holding attitude or holding direction of the detector owing to a multipath or fading caused by a geography which is affected by building, rows and moving vehicles. As a result, the detected values constantly vary within the range of some dB to some ten dB (microvolts). Therefore, such a system can be applicable only to locate rough position of vehicles moving high speed. However, such a system cannot be applied to the system wherein the location of a man or a vehicle is detected with a precision of some 10 meters.

There are various conventional methods to detect the position of a mobile vehicle or object. Means generally used for detecting the position on the ground and in the streets includes MCA (Multi-Channel Access), AVM (Automatic Vehicle Monitoring System), and GPS (Global Positioning System). Each will be described hereinafter.

(1) MCA

Today, a great number of vehicles for various delivery and transportation such as those of a delivery service company are seen all over the streets. When the dispatch center of a delivery service company wants to inform delivery or reception of an object to one of the delivery vehicles running in town upon receiving a call from a customer, it is common to send the instruction to the vehicle located closest to that customer from the standpoint of time and efficiency. In general, most of the delivery vehicles have a wireless such as of a MCA mounted. Conventionally, the dispatch center contacts the delivery vehicle considered to be running closest to that client by wireless. If the contacted vehicle is actually located near that client, a relevant instruction is provided to that vehicle. If the vehicle is located far away in contrary to the dispatch center's expectation, other vehicles are contacted sequentially until an appropriately located vehicle is identified. It was common to carry out such confirmation procedures.

(2) AVM

AVM is a practical system that can grasp the current position and state of activity of a running vehicle. This system includes a fixed station (operation control center), a repeater (user operation center), a sign post, and a mobile station. This system is already employed to dispatch taxis and the like efficiently.

(3) GPS

This system is generally employed to identify the position of a mobile vehicle. It is already commercially available as a navigation system for vehicles.

The above-described systems are known as conventional methods for detecting the position of mobile vehicles and objects.

A problem encountered in a MCA will be set forth in the following. If the driver of a vehicle also has to handle the delivery (simply referred to as "driver" hereinafter), the driver must leave the vehicle near the customer's destination to deliver or receive an item to or from the customer in an apartment or a building of an enterprise. Since the driver is remote from the vehicle during the door delivery or reception, there is a possibility that an inquiry of the position of the vehicle from a wireless of the dispatch center is not responded.

The dispatch center may not easily catch a delivery vehicle near the client even though the client has urgent needs. There was a problem that a complaint was filed of delayed service from customers.

Furthermore, the dispatch center must take the trouble to contact the driver of the mobile vehicle to have the driver's current location described orally in this MCA method. The driver must be frequently contacted through a wireless to accurately grasp the current position of the vehicle. This is not only tedious, but also places a considerable burden on the driver. In practice, the center side will contact a vehicle arbitrarily by a wireless to reach an appropriate vehicle after repeating contact to several vehicles. There was a problem that confirmation of the position information is troublesome.

In the AVM, a sign post provides the position information. However, such sign posts are installed only in the coverage area of the service vehicle. Naturally, there is a limit in using this system over a wide area range. There is also a problem that the sign post zone is so large that specification of the position of a mobile station becomes too rough to result in low precision of the position. There is also a limit in reducing the size and weight of the mobile station since the output power of the transmitter is 1 W. There is also a problem that the position information of a mobile station must be transmitted to the center station through a taxi wireless and the like, which is rather tedious. Furthermore, extension of the sign posts causes increase in the facility cost.

As to the GPS system, the mobile vehicle per se can confirm its own position. However, additional communication means is required to transmit the position information to the center side. Reduction in size, weight, and cost as a terminal system cannot be achieved.

There are also position confirmation devices that emits a weak wave and that can be carried by children, the aged, and handicapped individuals. However, the coverage area is extremely limited with such a weak wave that is allowed according to the current Wireless Telegraphy Act. Such position confirmation devices are not practical.

SUMMARY OF THE INVENTION

In view of the foregoing, an object of the present invention is to provide a position display system of a mobile terminal that can have its position detected at a low cost and with high accuracy.

Another object of the present invention is to provide a mobile terminal that allows position detection at a low cost and at high accuracy.

A further object of the present invention is to provide a center apparatus that is employed in a position detection system of a mobile terminal at a low cost and at high accuracy.

Still another object of the present invention is to provide a system that allows automatic transmission of position information of a mobile terminal carried by a driver and the like to a center apparatus even when the driver is remote from a vehicle.

A still further object of the present invention is to automatically provide the position of a mobile terminal carried by an individual to a center side apparatus without manual operation.

Yet a further object of the present invention is to provide a positioning system that can easily determine a propagation pattern of a wave.

A position display system of a mobile terminal according to an aspect of the present invention employs a small zone communication system. A repeater is provided in respective regions of a plurality of small zones. The position display system of a mobile terminal includes a mobile terminal carrying out communication with a repeater, a center control station for processing communication data with a plurality of repeaters, and a center station connected to the center control station and that can access communication data within the center control station. The center station includes a detection unit for detecting the position of a mobile terminal according to communication data.

Since a mobile terminal communicates with a repeater provided in each of a plurality of small zones so that the center station can access the center control station that processes the communication data to detect the position of the mobile terminal according to the communication data, the center station can easily identify which of the plurality of small zones the mobile terminal is located in.

Preferably, the small zone communication system is a PHS system (Personal Handyphone System). A small zone communication system does not have to be newly developed since an existing PHS system is to be employed.

Preferably, the center control station includes a database for identifying the plurality of small zones. The name of the repeater of the communication destination is stored in the database during communication between a mobile terminal and a repeater. The position detector detects the position of the mobile terminal according to the name of the repeater of the communication destination stored in the database.

Since the database of the center control station is used to detect the position of a mobile terminal, the repeater with which the mobile terminal is communicating can easily be identified.

In the position display system, the mobile terminal preferably includes a wireless communication unit for carrying out wireless communication with the center station. The mobile terminal enters a signal identifying the repeater during communication therewith. The mobile terminal position detector detects the position of the mobile terminal according to the signal from the mobile terminal designating a repeater.

The mobile terminal transmits the signal input during communication with a repeater that designates that repeater to the center station by wireless communication. The center station detects the position of the mobile terminal according to the signal indicating the repeater. Thus, position of a mobile terminal can easily be detected without using the database of the PHS system.

Further preferably, the mobile terminal includes a monitor for monitoring the intensity of an electric field for the plurality of repeaters, and a transmitter to send the electric field intensity of a repeater monitored by the monitor to the center station. The position detector identifies the position of the mobile terminal according to the transmitted electric field intensity of a plurality of repeaters.

Since the mobile terminal monitors the intensity of an electric field for a plurality of repeaters so that the position of the mobile terminal can be identified according to the electric field intensity from the plurality of repeaters, data of the center control station does not have to be used.

According to another aspect of the present invention, the mobile terminal of the first aspect includes an antenna for communication with a base unit, a unit for detecting an identification number that designates a repeater of the communication destination, and an output unit for providing the detected identification number to the center station.

Since the mobile terminal includes only the above-described components, a mobile terminal of a simple structure can be provided.

According to a further aspect of the present invention, the center station of the first aspect includes a unit for providing connection with the small zone communication system, a unit for requesting the identification number of a repeater with which the mobile terminal is communicating, a unit for receiving an identification number and detecting the position of the mobile terminal according to the received identification number, a unit for displaying a map in the proximity of the repeater, and a unit for displaying the position of the mobile terminal with a predetermined mark on the map.

Since the center station receives an identification number of a repeater with which the mobile terminal is communicating so that the position of the mobile terminal can be detected according to that number and displayed on a map, a center apparatus of low cost and high accuracy used in a position detection system of a mobile terminal can be provided.

According to a still further aspect of the present invention, a position display system of a mobile terminal employing a small zone communication system includes a repeater provided in each of a plurality of small zones, and a mobile terminal for carrying out communication with a repeater. The repeater provides its own ID information to a mobile terminal during communication with that mobile terminal. The position display system of the mobile terminal further includes a center station that can communicate with a mobile terminal. The center station detects the position of the mobile terminal according to the repeater identify information. Since a mobile terminal obtains a repeater identify information during communication with that repeater which is used to detect the position of the mobile terminal, the center station can easily identify where the mobile terminal is located in the plurality of small zones without using the information of the center control station.

Preferably, the mobile terminal includes a monitor for monitoring the intensity of an electric field of the plurality of repeaters, and a transmitter for sending the electric field intensity of the plurality of repeaters monitored by the monitor to the center station. The position detector has pattern information of a wave propagation according to the position of the mobile terminal. The position detector identifies the position of the mobile terminal according to the wave propagation pattern information and the electric field intensity from the plurality of repeaters.

Since the position of a mobile terminal can be identified according to the electric field intensity of the plurality of repeaters and wave propagation pattern information according to the position of the mobile terminal, the position of the mobile terminal can be identified at high accuracy.

According to yet a further aspect of the present invention, a position determination system includes a unit for obtaining the maximum propagation distance centered about a wave generation source for each level of electric field intensity to produce a first wave propagation pattern according to the obtained maximum propagation distance, a unit for detecting the arrangement and profile of a building around the wave generation source according to an electronic map, a unit for obtaining a crossing point of the first wave propagation pattern and the profile of a building, and a unit for automatically producing a second wave propagation pattern taking into account influence of the building from the crossing point of the first wave propagation pattern and the profile of the building.

Since the second wave propagation pattern is automatically produced taking into consideration the profile of a building from the crossing point between the first wave propagation pattern generated according to the wave maximum propagation distance centered about the wave generation source obtained for each electric field intensity and the profile of the building around the wave generation source obtained according to an electronic map, it is not necessary to take the trouble of determining a wave propagation pattern and computing according to the determined pattern. Therefore, a wave propagation pattern can be determined easily.

Preferably, there are a plurality of wave generation sources. A plurality of second wave propagation patterns are generated from the first wave propagation pattern on the basis of the plurality of wave generation sources and the profile of a building. A position is determined by detecting the overlapping portion of the plurality of formed polygons.

Since the overlapping portion of a plurality of second wave propagation patterns is obtained to determine the position using the overlapping portion, a position determining system that can easily determine a position can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 16 and 17 are schematic diagrams showing a three dimensional map and a wave propagation pattern obtained from that map.

FIG. 25 shows the accuracy and the distance range per one byte.

FIG. 26 shows the angular interval of a coordinate point train and the data length of a wave propagation pattern.

BEST MODE FOR PRACTICING THE INVENTION (A) First Embodiment

Embodiments of the present invention will be described hereinafter with reference to the drawings. The first embodiment will be described in which a small zone wireless communication system such as a PHS (simple portable telephone) is used.

A portable terminal of the PHS (referred to as "mobile station" hereinafter) is generally used as a cordless telephone at home. It can be used outside the house to be connected to a public network or a digital network via an indoor public repeater or an outdoor public repeater. In other words, it can be literally used as a handy portable telephone. The PHS greatly differs from the existing cellular type portable telephones (here, the existing portable telephone system will be generically referred to as the cellular system) in that the PHS is implemented based on a small zone system. A cellular type portable telephone has an output of at least 600 mW as a mobile station with a repeater installed for every region with a radius of 2–3 km in towns. The output of a repeater is 25–45 W. There are some that cover the distance of approximately 10 km at the outskirts. In contrast, the PHS has a weak output of approximately 10 mW for a mobile station. The output of a repeater is 20 mW, and only 100 mW at the outskirts. Therefore, the distance between a base distance and a mobile station allowing communication is approximately 100 m in towns and approximately 500 m at the outskirts. Although some telephone companies adapt a middle zone system for the PHS, it is not suitable for position detection. The small zone system of the PHS has a plurality of advantages set forth in the following.

(1) Since the repeater is reduced in size and weight, it can be installed on a telephone pole and on public telephone booths.

(2) The mobile station can be reduced in size, weight, and cost since the transmission output is low.

(3) Only a small capacity of the battery for a mobile station is required since the transmission output is low.

(4) Many more subscribers can use a certain channel number since the cell (zone) is small.

However, there is a disadvantage that it is not suitable for vehicles running at high speed in towns since the cell is small. However, it can be used in vehicles running at high speed at the outskirts since the cell is large.

The invention of the present application employs a wireless communication network of a small zone such as the PHS. The small zone wireless network is briefly shown in FIG. 1.

Figure 1:
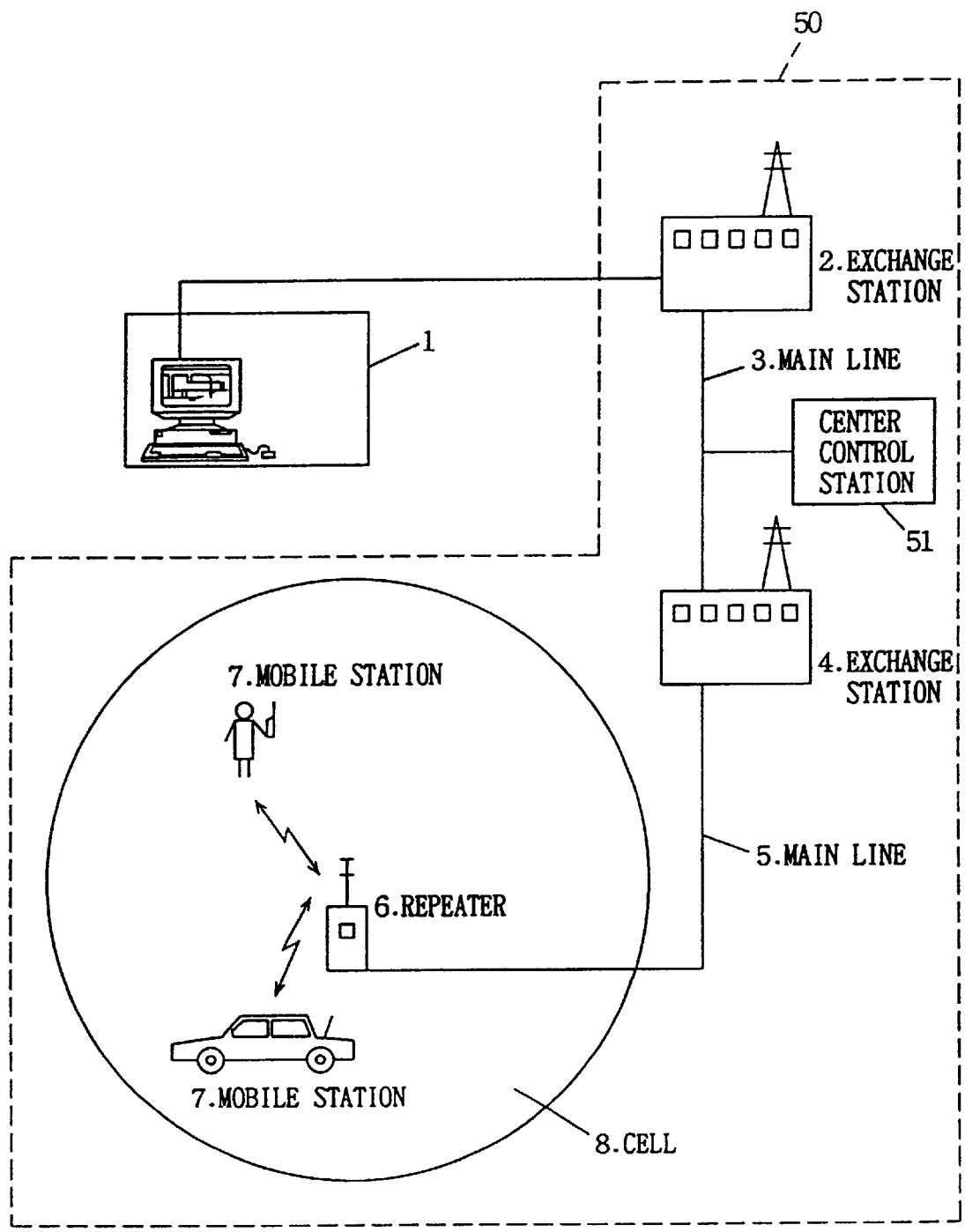
FIG. 1 is a block diagram showing an entire structure of a position display system of a mobile terminal according to the present invention.

Referring to FIG. 1, when a center station 1 that is fixed or that can be moved is to carry out conversation with a mobile station 7 that is currently moving, connection for conversation is established with mobile station 7 located within a cell 8 having a radius of approximately 100 m centering about a repeater 6 from an exchange station 2 to which center station 1 is connected through a main line 3, another exchange station 4, and another main line 5. Main lines 3 and 5 are connected to a center control station 51.

There is a PHS database in the PHS system. When center station 1 communicates with mobile station 7, the information that mobile station 7 is located within cell 8 of repeater 6 is stored in a repeater database 38 provided in center control station 51. Even if mobile station 7 does not establish conversation with repeater 6, information of its location is similarly stored into the database at the moment mobile station 7 enters the region of cell 8. Since the position of repeater 6 is identified in advance, the location of mobile station 7 can be identified to be within a circle range of approximately 100 m in radius centered about repeater 6 by taking advantage of the position information of repeater 6. Thus, the location of mobile station 7 can be identified.

Since information specifying repeater 6 corresponding to cell 8 in which mobile station 7 is located at a certain time point is entered and held in the PHS database, center station 1 can obtain that information from the technical standpoint.

Center station 1 has a system that can display map information on a display device. It is well known that a system for displaying a map information on a display device is easily available in the form of a CD-ROM such as in a navigation system of a vehicle.

The position information provided from the PHS database of repeater 6 corresponding to cell 8 in which mobile station 7 is located can be displayed on a screen of a display device of center station 1. Repeter 6 is indicated by a marker or the like. A circle area of 100 m in radius centering about that marker is displayed. It is identified that the mobile station is located within that circle area.

The center of this circle is obtained in a following manner. More specifically, an overlapping portion of a plurality of wave propagation patterns from a plurality of repeaters and based on the centroid, the center or the center of the shape surrounding the obtained figure to determine the center of the circle.

Figure 2:
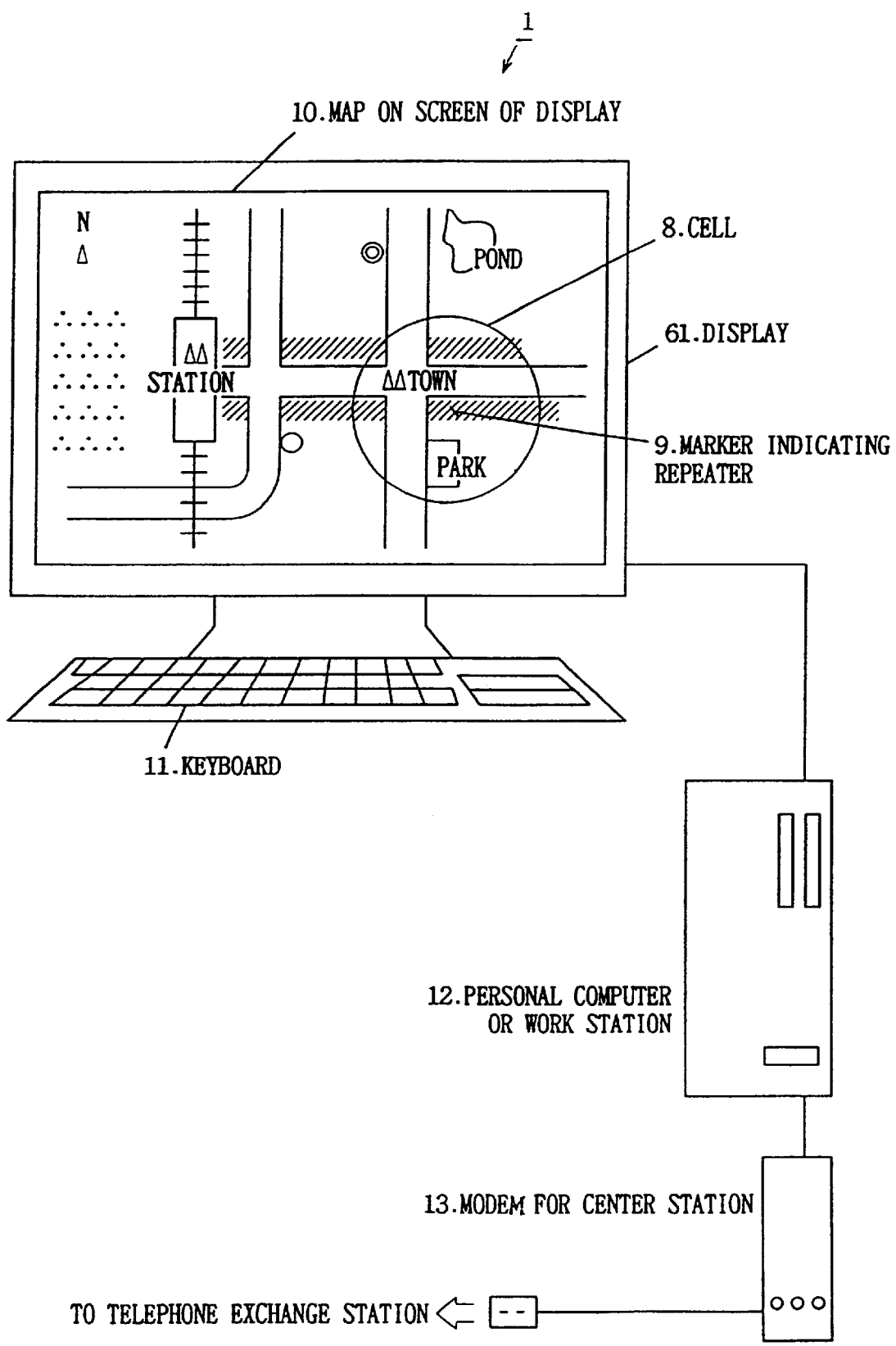
FIG. 2 is a block diagram showing a structure of a center station according to the present invention.

The configuration of center station 1 is shown in FIG. 2. Referring to FIG. 2, center station 1 according to the present invention includes a personal computer or a work station 12, a display 61 and a keyboard 11 connected to personal computer or work station 12. Personal computer or work station 12 is connected to a modem 13 for the center station. Exchange station 2 of the telephone central office shown in FIG. 1 is connected to center station modem 13.

In a map 10 appearing on a screen of the display of personal computer or work station 12 at center station 1, a marker 9 representing repeater 6 corresponding to cell 8 in which mobile station 7 is located, and a circle range of approximately 100 m in radius (may not be a circle in some cases) centering about marker 9 are displayed. It is indicated that mobile station 7 of interest is located within this circle region. Mobile station 7 per se cannot be provided on the display. A keyboard 11 and a mouse not shown can be used for manipulation.

Figure 11:
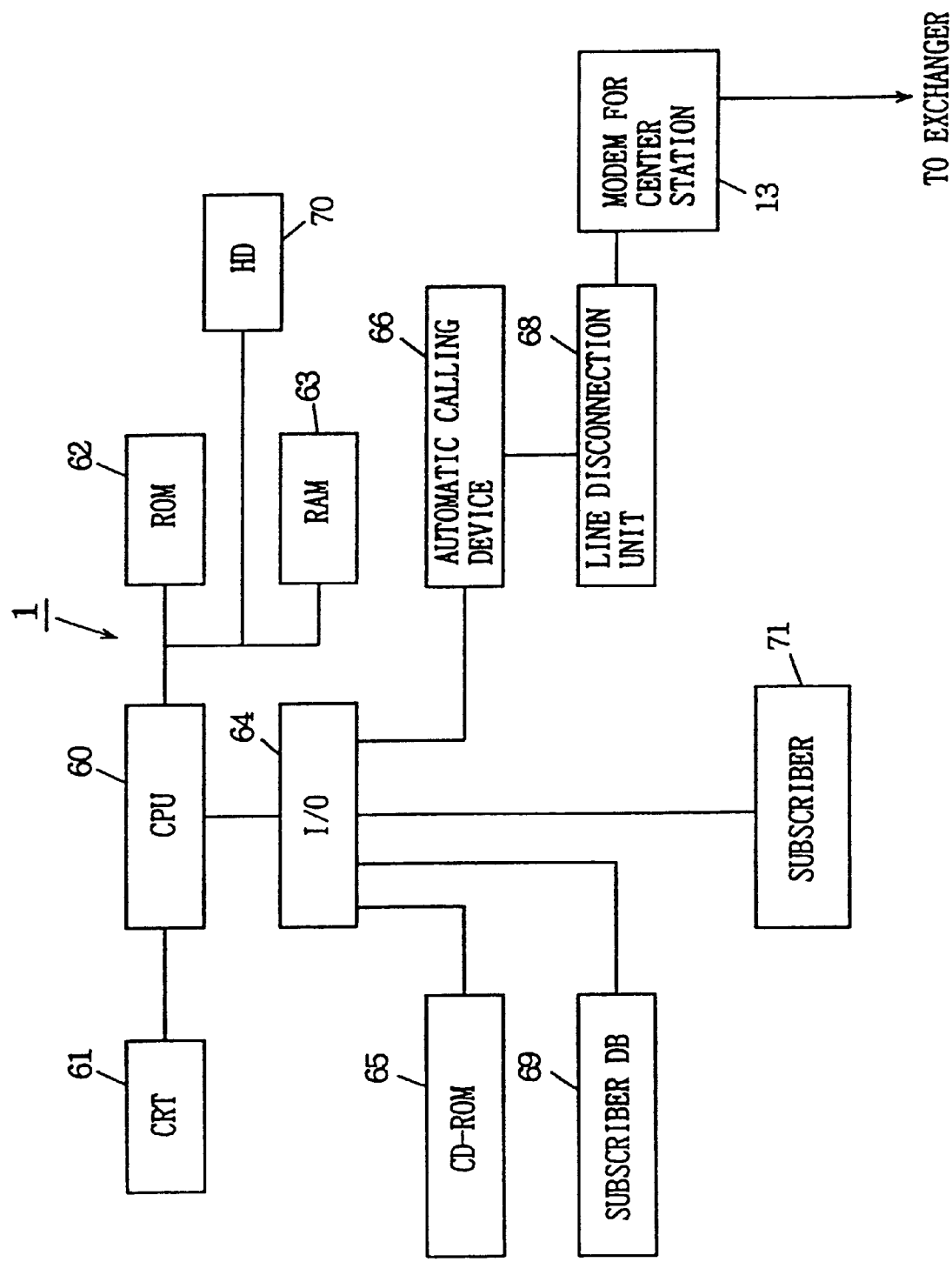
FIG. 11 is a block diagram showing a structure of a center station according to the first embodiment.

FIG. 11 is a block diagram showing a specific structure of center station 1. Referring to FIG. 11, center station 1 includes a CPU 60 for controlling the entire apparatus forming center station 1, a display 61 connected to CPU 60 for displaying the position of mobile station 7 on a map, ROM 62 and RAM 63 storing programs and the like defining the operation of center station 1, and an I/O interface 64 which provides interface with external devices.

A CD-ROM driver 65 for displaying map data, an automatic calling device 66 for providing connection with exchange station 2 for the PHS system, and a line disconnection unit 68 for effecting a call in automatic calling device 66 if necessary and disconnecting the line immediately after obtaining data of repeater 6 near which mobile station 7 is located are connected via I/O interface 64. Line disconnection unit 68 is connected to exchange station 2 of the telephone central office via center station modem 13.

In addition to designating mobile station 7 directly from center station 1 via keyboard 11, the line of a subscriber 71 inquiring the location of mobile station 7 can be connected via I/O interface 64. Detection of whether that input subscriber is a predetermined proper subscriber or not can be carried out using a subscriber database 69 connected to I/O interface 64.

The procedure for emitting a signal to search for the position of mobile station 7 and receiving position information is set forth in the following with reference to FIGS. 1, 2 and 11. First, keyboard 11 at center station 1 is operated and the PHS telephone number of mobile station 7 of interest is dialed automatically under control of personal computer or work station 12. Then, a telephone line to mobile station 7 is established via exchange station 2 and also repeater 6 corresponding to cell 8 in which mobile station 7 is located, as shown in FIG. 1. When a line connection is established between center station 1 and mobile station 7, the code number of the relevant repeater 6 is recognized and stored in the PHS database. Since this recognition and storage is carried out in an instant, the line between center station 1 and mobile station 7 can be immediately disconnected. The position information of repeater 6 is represented by a code number of repeater 6 or by a latitude and longitude of repeater 6. The position information is immediately transferred from the PHS database to modem 13 of center station 1 to be transmitted to personal computer or work station 12.

Map information is already transferred from the incorporated CD-ROM drive 65 in personal computer or work station 12. The map information is displayed as map 10 on a screen of display 61. By overlaying the position information expressed by a code or the longitude and latitude of repeater 6 on map 10, repeater 6 can be indicated with marker 9 as shown in FIG. 2. Although a circle region of approximately 100 m in radius centered about marker 9 of the relevant repeater is shown, a circle or a graphic form of an arbitrary shape can be provided easily by programming. FIG. 2 shows only a way of example of the system of the present invention. The present invention is not limited to the structure shown in FIG. 2.

As described above, the entry of a mobile station 7 into a cell 8 of a repeater 6 causes the position information to be recognized and stored in the database and then provided to center station 1. Therefore, identification can be made that mobile station 7 is located within a circle range of approximately 100 m in radius about a certain repeater 6.

Alternatively, position information of mobile station 7 can be obtained from the database by telephoning mobile station 7 from center station 1. Although the bell is rung in a conversation operation in this system, it is not necessary to ring the bell in obtaining position information. It is preferable to mute the bell so that the driver will not be distracted. Also, the function is desired of immediately disconnecting the line between center station 1 and mobile station 7 right after the code of a certain repeater corresponding to a cell in which mobile station 7 is located is transmitted to center station 1 from the PHS database. Although the communication procedure (protocol) will be slightly modified from that of a general conversation for obtaining position information, this is of no technical problem.

This means that mobile station 7 does not necessarily have to be the normal telephone set in the invention of the present application. Only the function of communication with repeater 6 is basically required. Alternatively, an exclusive mobile station dedicated for the present invention may be used in the system in which mobile station 7 is telephoned from center station 1 such that the telephone call from center station 1 is first automatically received and maintained for a constant time period, followed by automatic disconnection of the line.

In such a dedicated mobile station, the normal conversation function is not required. Only the communication function with repeater 6, or the function of automatic reception and response and disconnection of the communication after a constant time period is required. In this case, identification of repeater 6 corresponding to cell 8 in which mobile station 7 is located is effected mainly using a control channel of the PHS. Therefore, various push buttons, a liquid crystal display, a speaker, a microphone, and relating electronic circuit components can be omitted adequately. It may be advantageous to provide an emergency button for calling to notify an emergency state when an abnormal state occurs at the mobile station side. Thus, such an exclusive mobile station can be considerably reduced in cost and weight than a general PHS telephone handset. The exclusive mobile station may not necessarily include an emergency button.

Although the standard type portable telephone of the PHS can be used as a mobile station in the present invention, an exclusive mobile station (a exclusive mobile terminal) having the above-described various buttons, liquid crystal display, speaker, microphone, and electronic circuit components related thereto omitted is advantageous. Such an exclusive mobile station can be considerably reduced in size, weight and cost by omitting these electronic circuit components. According to the present invention, center station 1 can identify the position information of mobile station 7 by just having data provided from the database.

Figure 3:
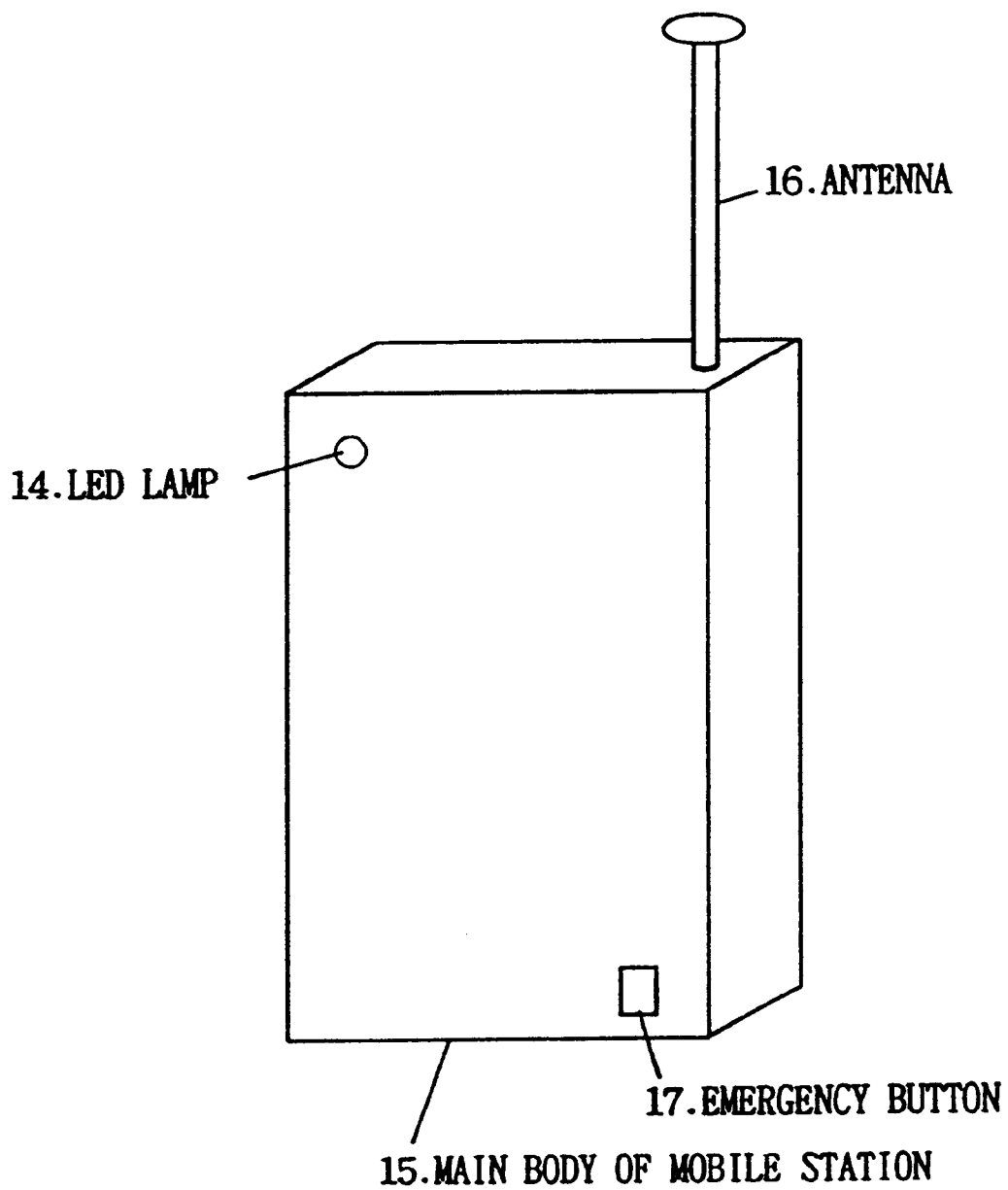
FIG. 3 is a block diagram showing a specific structure of a dedicated terminal (mobile station) used in the present invention.

Referring to FIG. 3, an exclusive mobile terminal (mobile station) includes a main body 15 of the mobile station, an antenna 16, an emergency button 17, and an LED lamp 14. The structure of mobile unit 7 shown in FIG. 3 is only a way of example, and the standard telephone set of the PHS can be used. Mobile station 7 is not limited to that shown in FIG. 3.

Here, mobile station 7 is called from center station 1 to obtain the position information of mobile station 7. Center station 1 places a telephone call to mobile station 7 through several exchange stations and a repeater 6 of the PHS corresponding to cell 8 in which mobile station 7 is located. In contrast to the normal state where the bell of the telephone of mobile station 7 is rung at this stage, the bell is mute in the present invention since only repeater 6 corresponding to cell 8 in which mobile station 7 is located has to be identified. The PHS database instantly recognizes and stores the information that mobile station is located within cell 8 of repeater 6. The line connection between center station 1 and mobile station 7 is then disconnected immediately thereafter. Although the PHS communication protocol and the circuit of the mobile station must be partially modified for this operation, there is no technical problem thereto. Alternatively, the bell may be rung if the user does not mind.

Figure 12:
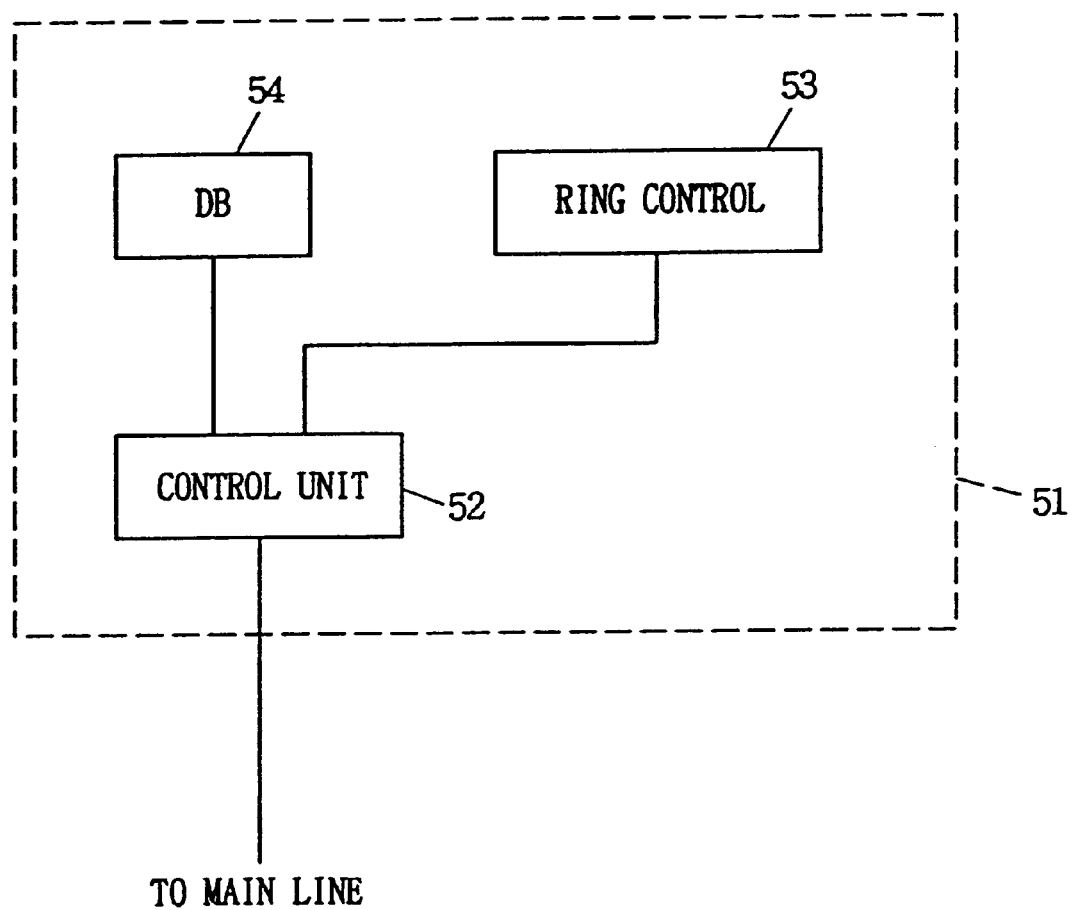
FIG. 12 is a schematic diagram showing the internal structure of a center control station.

FIG. 12 is a schematic diagram of the internal structure of center control station 51. Referring to FIG. 12, a control unit 52, and a repeater identify database 54 for identifying the PHS repeater 6 connected to control unit 52 are connected to center control unit 51. A ring control unit 53 for providing control of suppressing or not suppressing a bell ring of mobile station 7 is connected to control unit 52. Ringing or not ringing the bell of mobile station 7 is effected by control of ring control unit 53 by a conversation signal input via a main line and control unit 53.

The obtained position information of mobile station 7 is transmitted to center station 1. The position information of each repeater expressed by the accurate longitude and latitude is prepared in advance in repeater database 53 in center control station 51. The code or longitude and latitude of a relevant repeater 6 is notified to center station 1. Center station 1 attains a standby state where map 10 is provided on display 61 of various computers such as personal computer or work station 12. This map display system is a part of the existing system that is generally used in the navigation system of a vehicle and the like. All the map information is displayed together with the information of the longitude and the latitude. Therefore, the longitude and latitude information of repeater 6 transmitted from a telephone central office to center station 1 can be displayed as shown in FIG. 2 marked with repeater 6 where it is actually located on the map of the display screen of the above-mentioned computer.

It can therefore be identified that the position of the vehicle in which mobile station 7 is mounted is located within the circle area of approximately 100 m in radius centering about repeater 6 displayed on map 10 on display 61. In this case, visual attraction can be obtained by displaying only the marker of the relevant repeater 6 in a blinking manner.

Center station 1 sequentially polls a plurality of mobile stations 7, whereby the position of each mobile station 7 is displayed on the map of the display as respective circle regions of approximately 100 m in radius by the position information of each repeater. The location of each vehicle can be identified at a glance by assigning number 1, number 2, number 3, . . . to respective mobile stations 7.

The operation of collecting the position information of each mobile station 7 from center station 1 can be carried out with no burden on the driver of the delivery service vehicle and with no trouble according to a system of a delivery service company. Since polling is carried out, not for the purpose of conversation, but just for identifying repeater 6, the line is occupied for only a moment. The telephone usage fee to carry out polling for the purpose of collecting position information is generally at the minimum unit level. It is economical and there will be no waste in the usage of the PHS channel. If the operating enterprise of the PHS settles a contract with the user at a fixed amount system (a fixed fee per month), month), the expense for the user will not increase even if the number of pollings is increased.

Since center station 1 can constantly grasp the location of all mobile stations 7 on map 10 on display 61, the delivery vehicle closest to the residence of a customer out of all the mobile stations 7 can be identified so that the most appropriate delivery vehicle can be contacted to provide instructions. The telephone used for providing instructions may be a cellular type telephone, a PHS type telephone, or a MCA type telephone, or one of other communication systems. However, conversation communication will probably be carried out with a PHS telephone in most cases taking into consideration the fact that the main advantage of the present invention lies in that collection and transmission of a position information and normal conversation can be implemented by the same PHS mobile station.

As mentioned before, the PHS system is not suitable for communication with a vehicle that travels at high speed since the area of a cell is small in towns. Strictly speaking, the position information of a vehicle that is running at high speed cannot easily be obtained in real time. However, communication is allowed when such a vehicle stops or slows down at crossings and signals. Therefore, there is no great problem in practical usage. In the suburbs, the area of a cell is great. Therefore, there is no problem in collecting the position information of a vehicle running at high speed.

Figure 4:
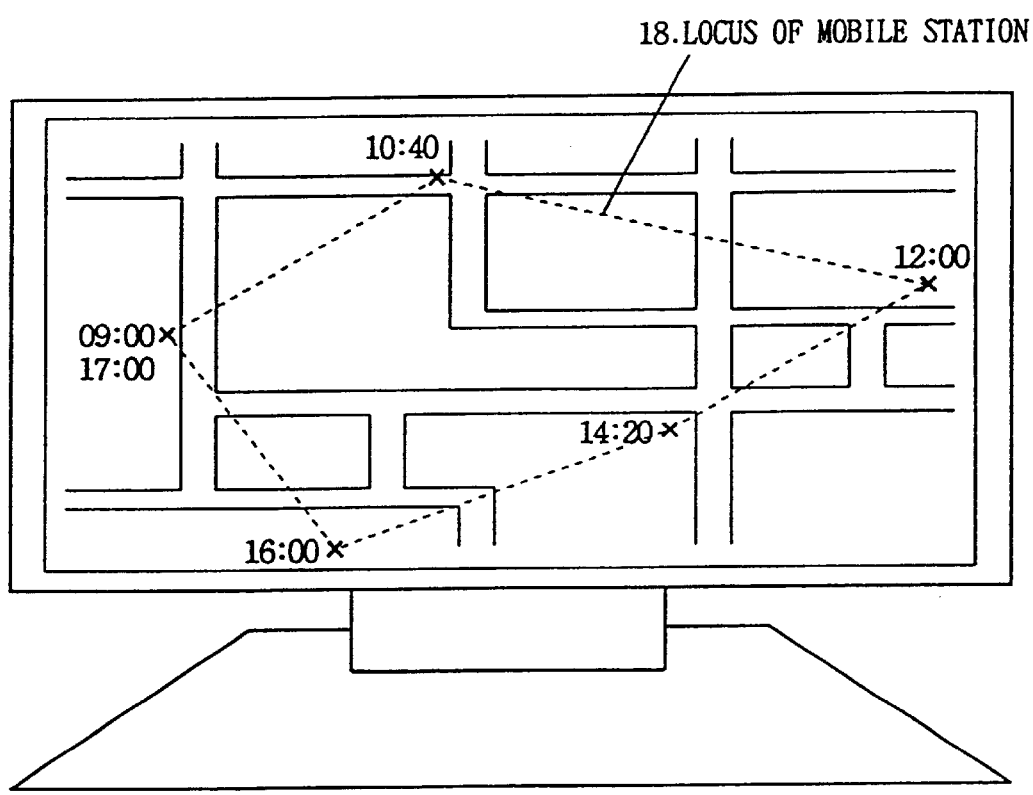
FIG. 4 is a diagram showing the locus of travel of a mobile station.

Alternatively, the position information of mobile station 7 that changes over time can be stored in a hard disc 70 of personal computer or work station 12 at the center station 1 side. By sequentially extracting and reproducing the data of position information afterwards, the locus of the position of mobile station 7 can be displayed with its time as shown in FIG. 4 while tracing the position of mobile station 7 on map 10 presented on display 61. Further alternatively, the time and position information can be displayed as a list.

Although the procedure for retrieving position information has been described in detail, it is to be noted that a call under the normal protocol is effected in the call of a general conversation and data transmission, whereby a bell rings and connection of a line is maintained.

In the above, a method was described of obtaining position information indicating which cell of repeater 6 mobile station 7 is located according to the data stored in the database of the telephone company side. In the following, a method of identifying the position information of mobile unit 7 without using the database will be described.

(B) Second Embodiment

In the second embodiment, the small zone wireless communication system (including wireless telephone) such as the PHS shown in FIG. 1 is used. In the communication between repeater 6 and mobile station 7, a transmission identification code (CS-ID) and a reception identification code (PS-ID) as shown in FIGS. 5 and 6 are transmitted therebetween regardless of whether the system is a public system including a center station 1, exchange stations 2 and 4 of a public network, a digital network, and the like, repeater 6, and mobile station 7, or a self-management system.

Figure 5:
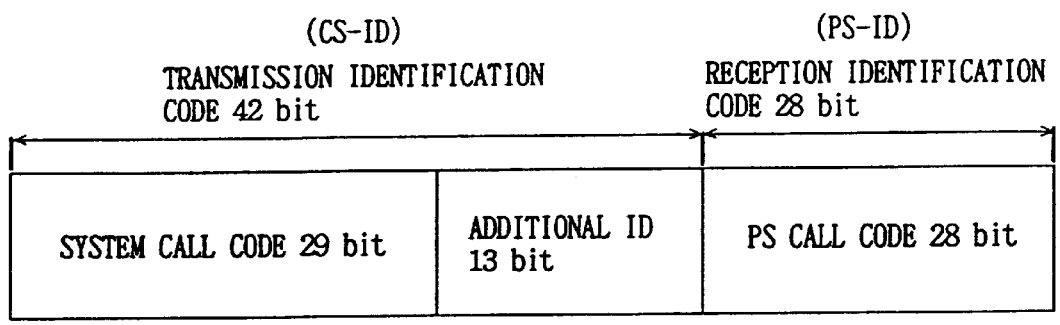
FIG. 5 shows an example of a structure of a transmission identification code and a reception identification code transferred between a repeater and a mobile station in a self-management system.

FIG. 5 shows an exemplary structure of a transmission identification code and a reception identification code for transmission between a repeater (CS) 6 and a mobile station (PS) 7 in a self-management system. Referring to FIG. 5, a transmission identification code specifying a repeater is formed of 42 bits, including a 29-bit system call code representing a calling code of the self-management system and a 13-bit additional ID representing the repeater ID code of the self-management system. A reception identification code for specifying a mobile station is formed of 28 bits.

Figure 6:
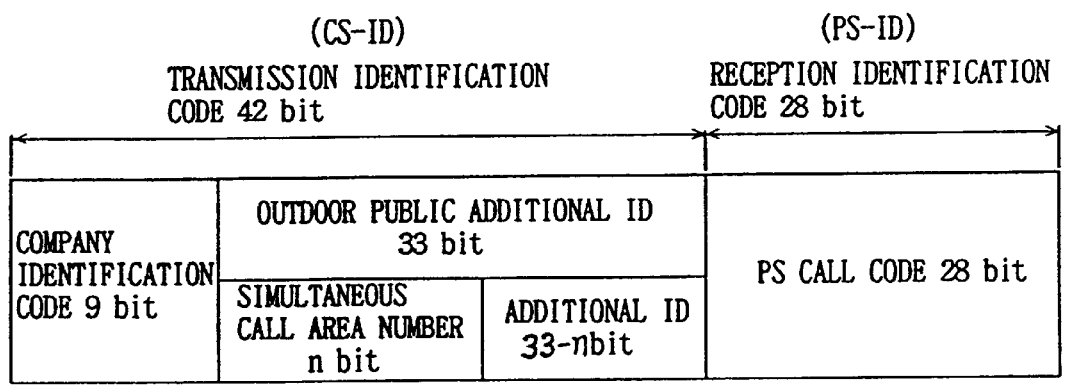
FIG. 6 shows an example of a structure of a transmission identification code and a reception identification code transferred between a repeater and a mobile station in a public system.

FIG. 6 shows an exemplary structure of a transmission identification code and a reception identification code for communication between a repeater 6 and the mobile station 7 in a public system. Referring to FIG. 6, a transmission identification code is formed of 42 bits, including a 9-bit company identification code which is code for a telephone company, and a 33-bit outdoor public additional ID code for specifying a repeater for an outdoor public network. The door public additional ID code includes a simultaneous call area number and an additional ID number for calling a plurality of a repeaters simultaneously within a certain area to call up a particular terminal. The reception identification code for specifying a mobile station is formed of 28 bits.

By providing a function in mobile station 7 so that additional ID information (data) indicating the code number of a repeater 6 is extracted and entered at the mobile station 7 side, and then transmitted to center station 75 via a relevant wireless communication system (including wireless telephone), the information of which cell of repeater 6 mobile station 7 is located in can be obtained by center station 1 without depending upon the database of the telephone company.

Figure 13:
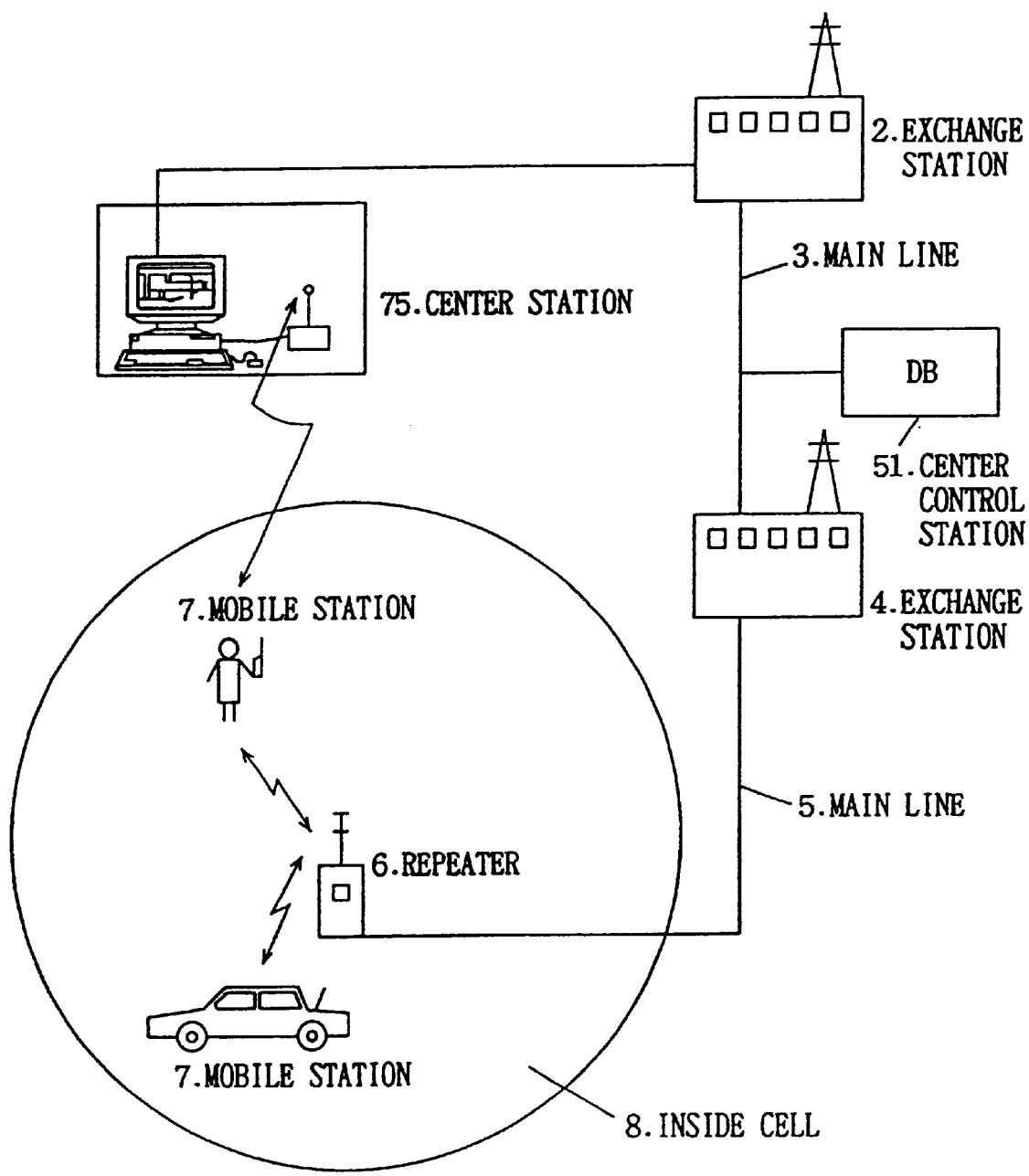
FIG. 13 is a schematic diagram showing transfer of information among a repeater, a mobile station, and the center station according to a second embodiment.
Figure 14:
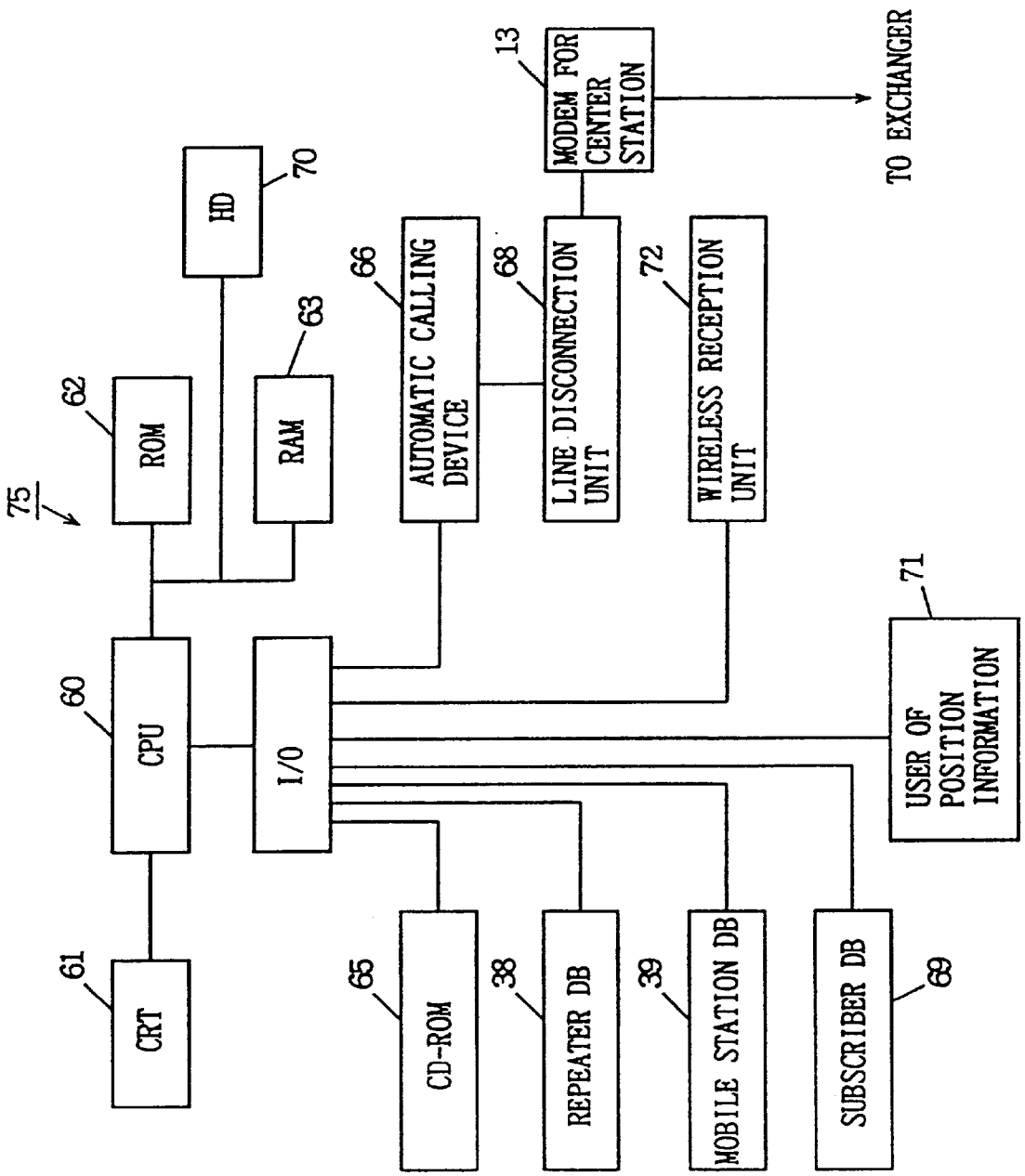
FIG. 14 is a block diagram showing a structure of the center station according to the second embodiment.

FIG. 13 schematically shows transfer of information among repeater 6, mobile station 7, and center station 1 according to the second embodiment of the present invention. Referring to FIG. 13, mobile station 7 is called from repeater 6 forming the PHS system in the second embodiment. When an identification number specifying a repeater 6 corresponding to mobile station 7 is obtained by that call, a relevant signal is transmitted to a center station 75 via wireless. FIG. 14 is a block diagram showing a structure of center station 75 according to the second embodiment, and corresponds to FIG. 1 of the first embodiment. Referring to FIG. 14, center station 75 is similar to center station 1 of the first embodiment, provided that a repeater database 38, a mobile station database 39, and a wireless receiver unit 72 are added. The remaining elements are similar to those of FIG. 11, and their description will not be repeated. Wireless receiver unit 72 receives a transmission identification code of repeater 6 sent from mobile station 7 via a wireless. The received transmission identification code refers to repeater database 38 and mobile unit database 39, whereby repeater 6 corresponding to mobile station 7 is identified. The identified repeater is provided on display 61.

The additional ID information indicating the code number of repeater 6 can be stored in a memory at the mobile station 7 side. When requested from the center station 1 side, the data of the additional ID can be transmitted to the central station 1 via a relevant wireless communication system.

Figure 15:
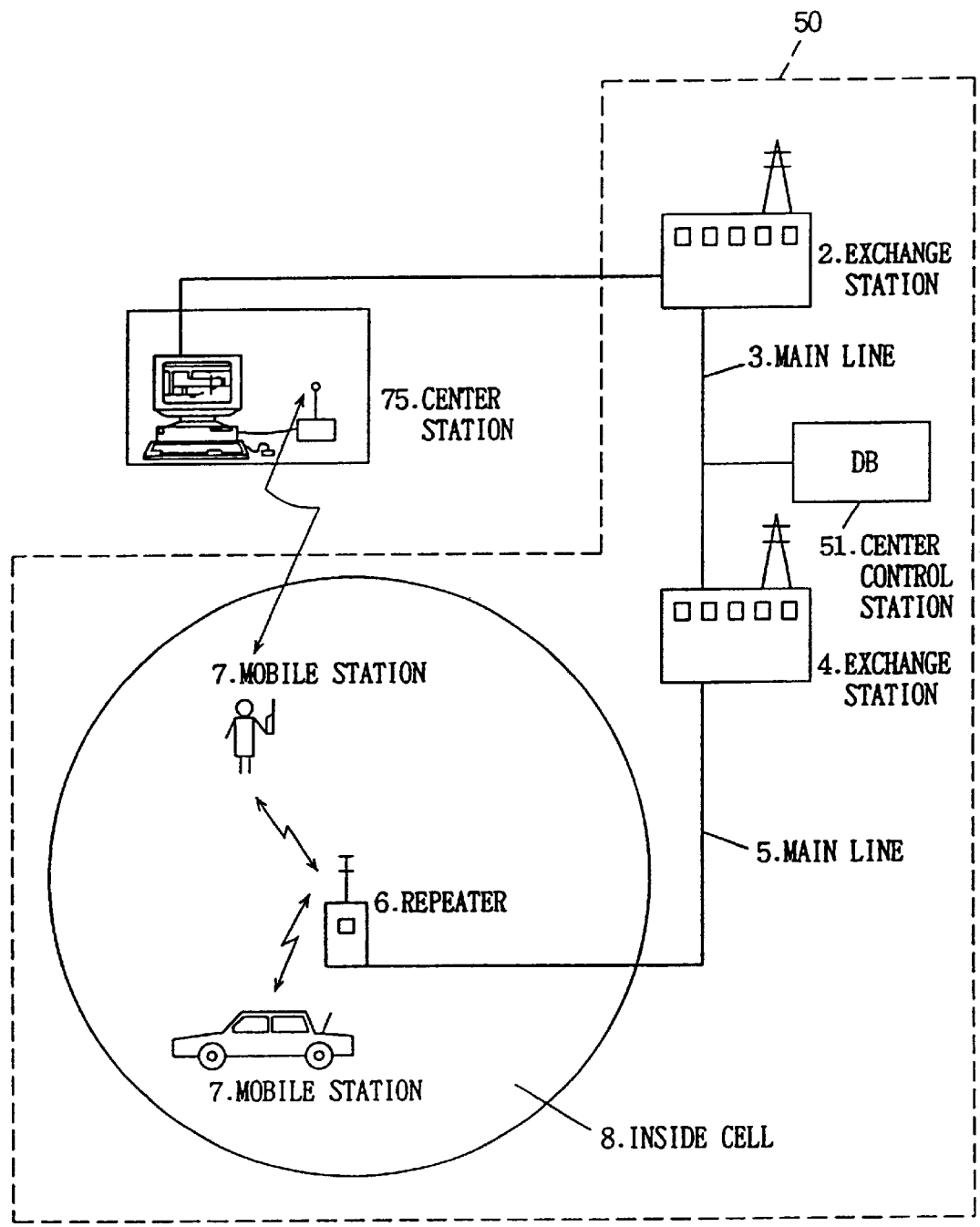
FIG. 15 is a schematic diagram showing a modification of the second embodiment.

Although mobile station 7 identifies a repeater 6 by a call from repeater 6 in the above embodiment, transmission and reception of a request command can be effected by a wireless system independent of the telephone network of the PHS system to output a repeater data (additional ID) that specifies the zone where it is located to identify the position of mobile station 7 at the center station 1 side. A schematic diagram of such a case corresponding to FIG. 13 is shown in FIG. 15.

Figure 7:
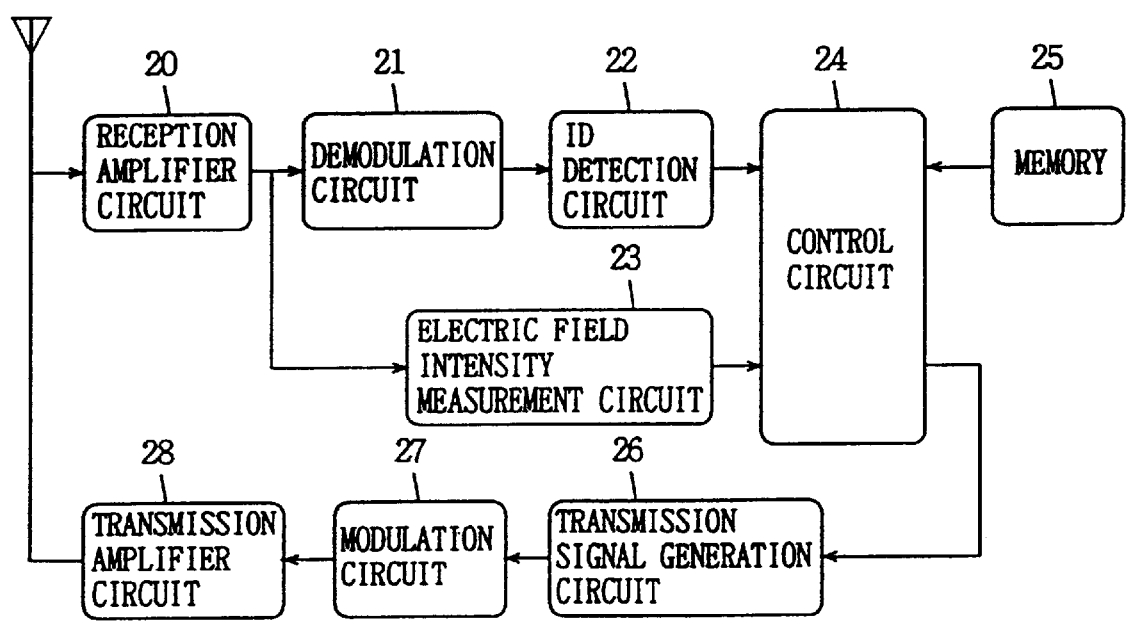
FIG. 7 is a circuit diagram of a dedicated terminal (mobile station).

FIG. 7 is a block diagram showing a circuit configuration of an exclusive terminal (mobile station 7). The audio circuitry, display circuitry, and key operation circuitry are removed since the terminal is a dedicated one. Referring to FIG. 7, a mobile station 7 serving as an exclusive terminal includes an antenna 19 for transmission and reception, a reception amplifier circuit and a demodulation circuit 21 for amplifying and demodulating a signal received by antenna 19, an additional ID detection circuit 22 for detecting an additional ID to identify repeater 6 according to the demodulated signal, and an electric field intensity measurement circuit 23 for measuring an electric field intensity according to the signal amplified by the reception amplifier circuit 20. Mobile station 7 further includes a control circuit 24 connected to ID detection circuit 22 and electric field measurement circuit 23 for providing control of the entire mobile station 7, and a storage circuit 25 connected to control circuit 24. Following detection of a repeater, the additional ID and the electric field intensity of that repeater are provided to center station 75 via a transmission signal generation circuit 26, a modulation circuit 27, a transmission amplifier circuit 28, and antenna 19. The operation will be described hereinafter.

In FIG. 7, the ID and electric field intensity of one or a plurality of repeaters 6 stored in storage circuit 25 are sent from storage circuit 25 to control circuit 24 in response to a request command from center station 75 to be applied to transmission signal generation circuit 26.

Figure 8:
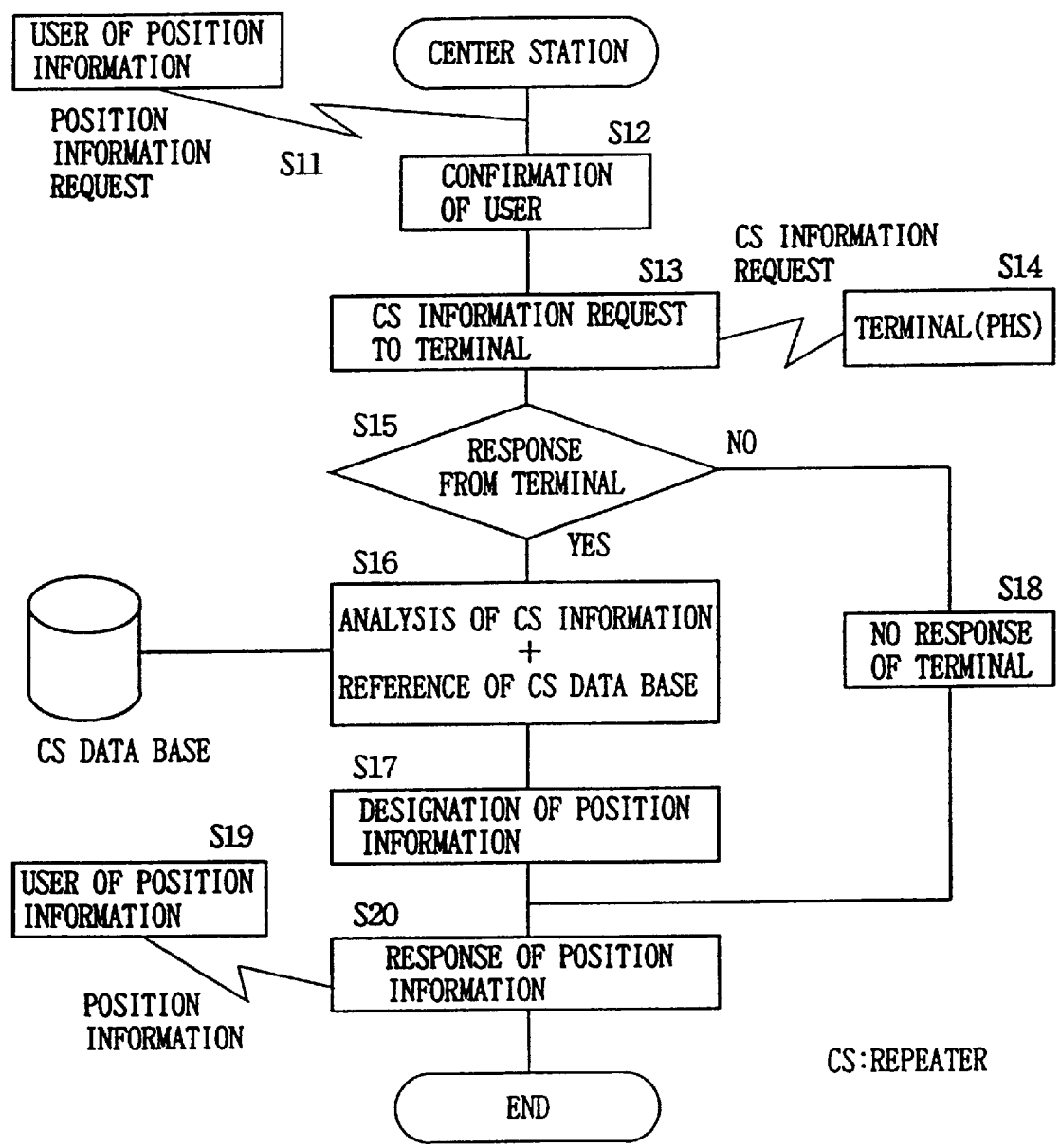
FIG. 8 is a flow chart of a position search procedure in the center station.

The position detection operation can be represented as FIG. 8. FIG. 8 is a flow chart showing the procedure of position detection according to the second embodiment. Upon request of position information from an authorized user of position information (user under contract) to center station 75 (step S11: "step" omitted hereinafter), center station 75 confirms the user with a password or the like (S12). If the contractor is a proper one, a request for information of repeater 6 is dispatched to the terminal of interest (S13). Upon receiving information of repeater 6 from mobile station 7 (S14, S15), the information is analyzed and repeater database 38 is referred to in order to identify the position (S16, S17). The information of repeater 6, i.e. the address or longitude and latitude of repeater 6 with respect to the ID code of repeater 6 together with the transmission power and other information of repeater 6, is stored in repeater database 38. The obtained position information is provided to user 71 requesting the position information to complete the position detection operation. By using this method, even the electric field intensity of mobile station 7 can be grasped at center station 75. Therefore the position can be identified not to the ambiguous level of within an area of 100 m in radius about repeater 16, but to a considerably higher precise level. The reception power is inversely proportional to the square of the distance of the antennas between a transmitter and a receiver according to the transmission equation of Friis shown in equation (1).

Reception power=antenna gain of transmitter×antenna gain of receiver×transmission power÷(4π×distance between transmitter and receiver/wavelength of wave)²     (1)

Figure 9:
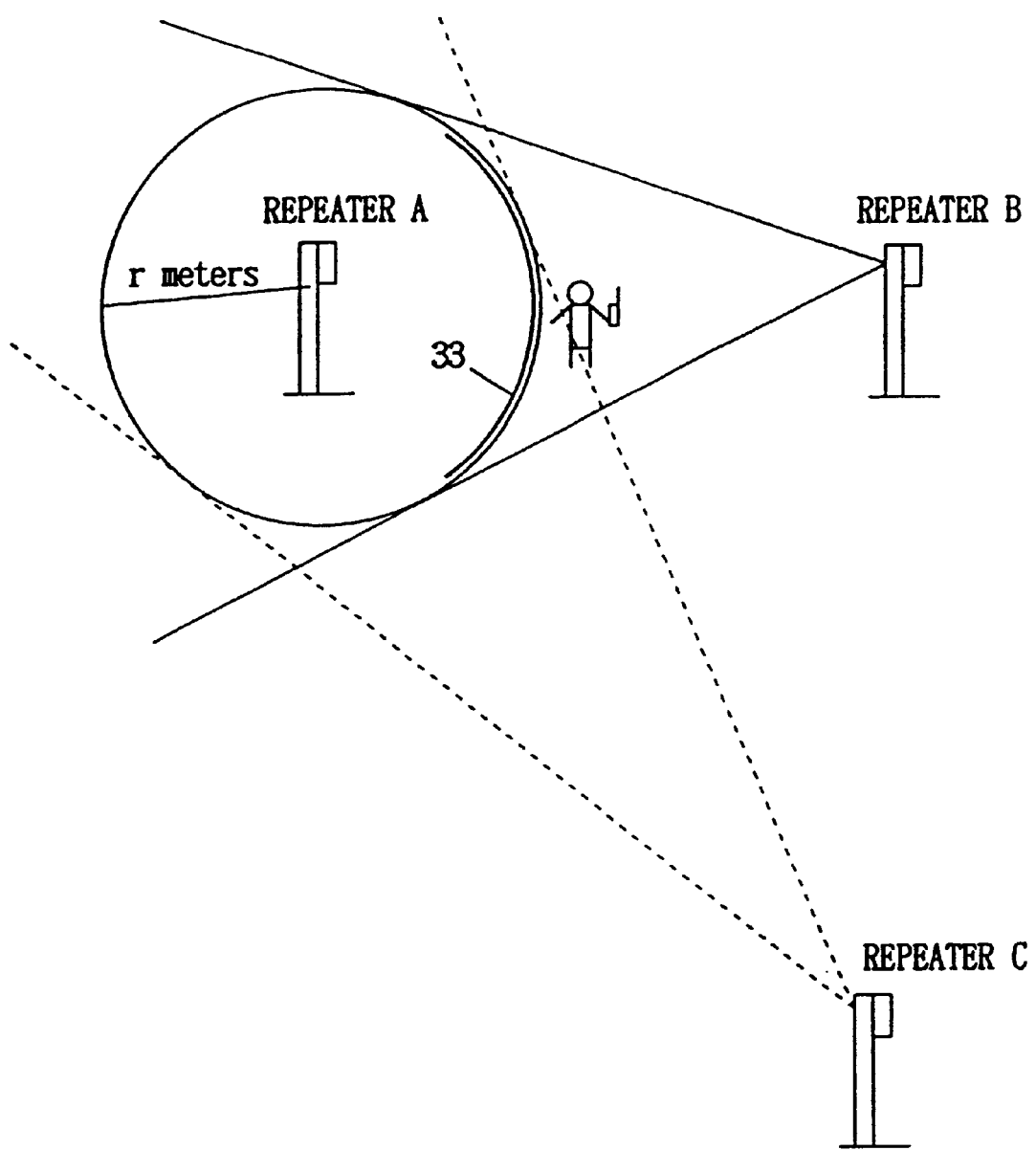
FIG. 9 shows the principle of the position operation of a mobile station.

Therefore, the distance between repeater 6 and mobile station 7 can be calculated from the magnitude of the reception power obtained by electric field intensity measurement circuit 23 shown in FIG. 7. The basic principle is shown in FIG. 9.

Assuming that r meters is the distance between the transmitter and the receiver obtained by reverse-calculation of equation (1), it is appreciated that mobile station 7 is located substantially on the circumference of a circle with a radius of approximately r meters from repeater A of the strongest electric field intensity. By drawing a tangent from repeater B and repeater C having the next strongest level of electric field intensity towards the circle with this radius of r meters to form an arc which is a portion of the circumference of the circle of r meters in radius, mobile station 7 will be located on this arc 33. As a result, the position of mobile station 7 can be identified at a higher level of accuracy.

Figure 10:
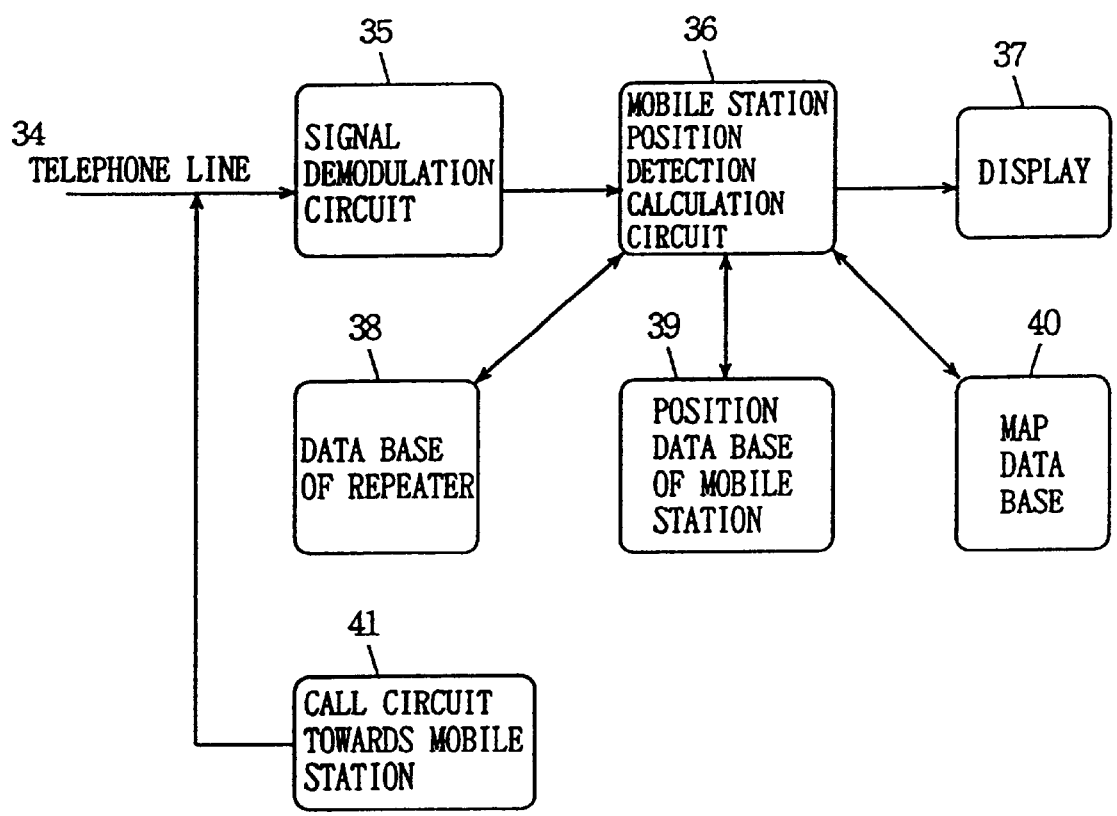
FIG. 10 shows an example of a control circuit of the center station.

FIG. 10 shows an example of elements of the system at the center station 75 side for the calculation to obtain detection of mobile station 7 and displaying the obtained position on a map. Referring to FIG. 10, 34 designates a telephone line, 35 designates a signal demodulation circuit, 36 designates a mobile station position detection calculation circuit, 37 designates a display, 38 designates a database of repeater 6, 39 designates a position database of mobile station 7, 40 designates a map database, and 41 designates a call circuit towards mobile station 7.

It is important to note that the position of the repeater cannot be identified just by the data sent from mobile station 7 such as the ID code of a plurality of repeaters. In order to detect the position of a repeater, repeater information such as the position of a base position 6 (address or the longitude and the latitude), the transmission output of repeater 6, and the height of the antenna corresponding to the ID of respective repeaters 6 must be prepared in advance as repeater database 38. Also, database 40 of an electronic map must also be prepared. Position detection calculation circuit 36 of mobile station 7 uses the data of the plurality of is repeaters sent from mobile station 7 to calculate distance r between repeater A having the greatest electric field intensity and the mobile station to draw a circle with a radius of r centered about repeater A, and then draws a tangent from the respective positions of repeaters B, C, . . . having the second, third, . . . strongest electric field intensity to form arc 33. The position information of the repeater is designated referring to map database 40 to display mobile station 7 on the map. Database 39 of mobile station 7 stores the calculated data.

(C) Third Embodiment

A third embodiment of the present invention will be described hereinafter. Similar to the first and second embodiments, the small zone wireless communication system such as the PHS is employed in the third embodiment.

Figure 17:
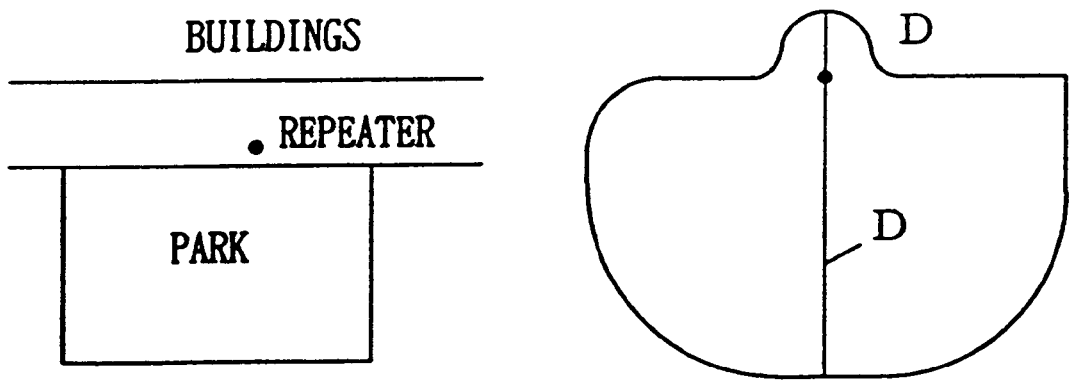

FIG. 16 is a schematic diagram showing wave propagation pattern information of center station 1 according to the third embodiment. The left side represents a three dimensional map shown in map 10, and the right side represents the wave propagation pattern thereof. (A) indicates the case where repeater 6 is installed in the proximity of a crossroad, (B) indicates the case where repeater 6 is installed at a straight road, and (C) shows the case where repeater 6 is installed in the proximity of a forked road. FIG. 17 shows the wave propagation pattern where there is a building at one side and a park at the other side of a straight road.

In the third embodiment, such information is stored in CD-ROM 65 of center station 1 and in repeater DB 38. Center station 1 carries out a simulation according to this information and the electric field information from the plurality of repeaters shown in the second embodiment to identify the specific position of mobile station 7.

The relationship between distance and electric field intensity for carrying out this simulation will be described hereinafter. The relationship of the distance between repeater 6 and mobile station 7 and electric field intensity is represented by the following equation.

$$D = f(E) \quad (2)$$

The linear approximate expressions in the longitudinal direction of the straight road is expressed by the following equation.

$$D = -16E + 1100 \quad (3)$$

The linear approximate expression in the breadthwise direction is expressed by D=30 (m).

Here, D represents the distance from a repeater (m), and E represents the electric field intensity (dB$\mu$V/m).

The distance between repeater 6 and mobile station 7 can be calculated by the above experimental equations.

Figure 18:
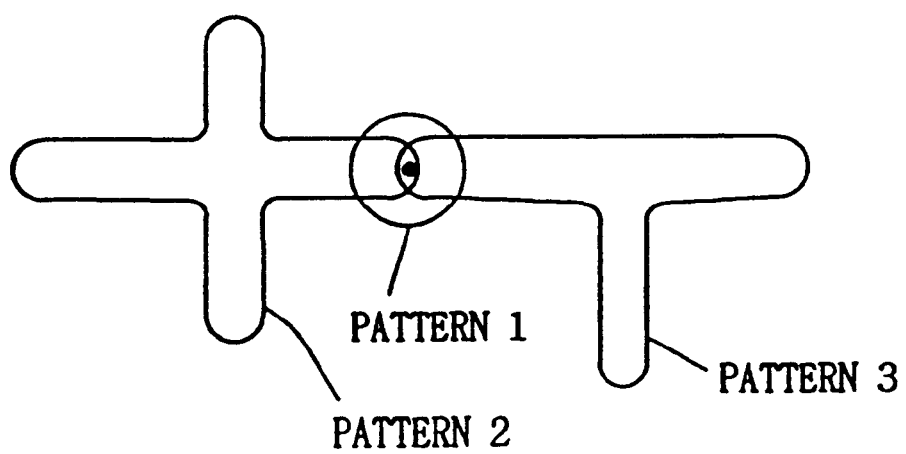
FIG. 18 shows a method of identifying the position of a mobile station according to a plurality of wave propagation patterns.

FIG. 18 is a schematic diagram for specifying the position of mobile station 7 according to the simulation. Referring to FIG. 18, it is now assumed that three pattern information of pattern 1, pattern 2, and pattern 3 are obtained from the electric field information and wave propagation pattern of three repeaters 6. Mobile station 7 is located at the overlapping portion of these patterns.

Figure 19:
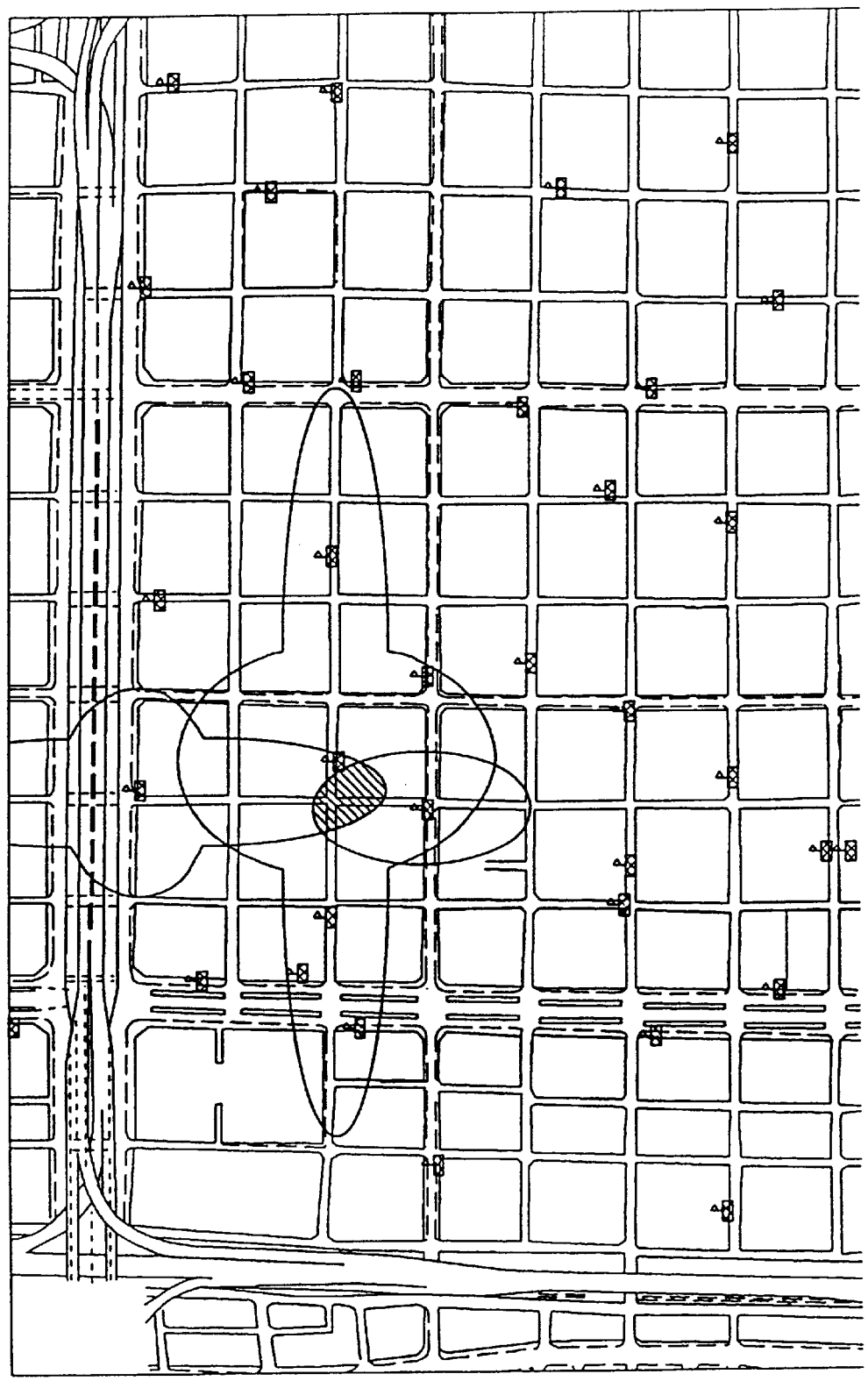
FIG. 19 shows a range of location of a mobile terminal when a test is actually carried out.

FIG. 19 shows the position of mobile station 7 identified according to the present embodiment. Mobile station 7 is located at the shaded area in FIG. 19.

Figure 20:
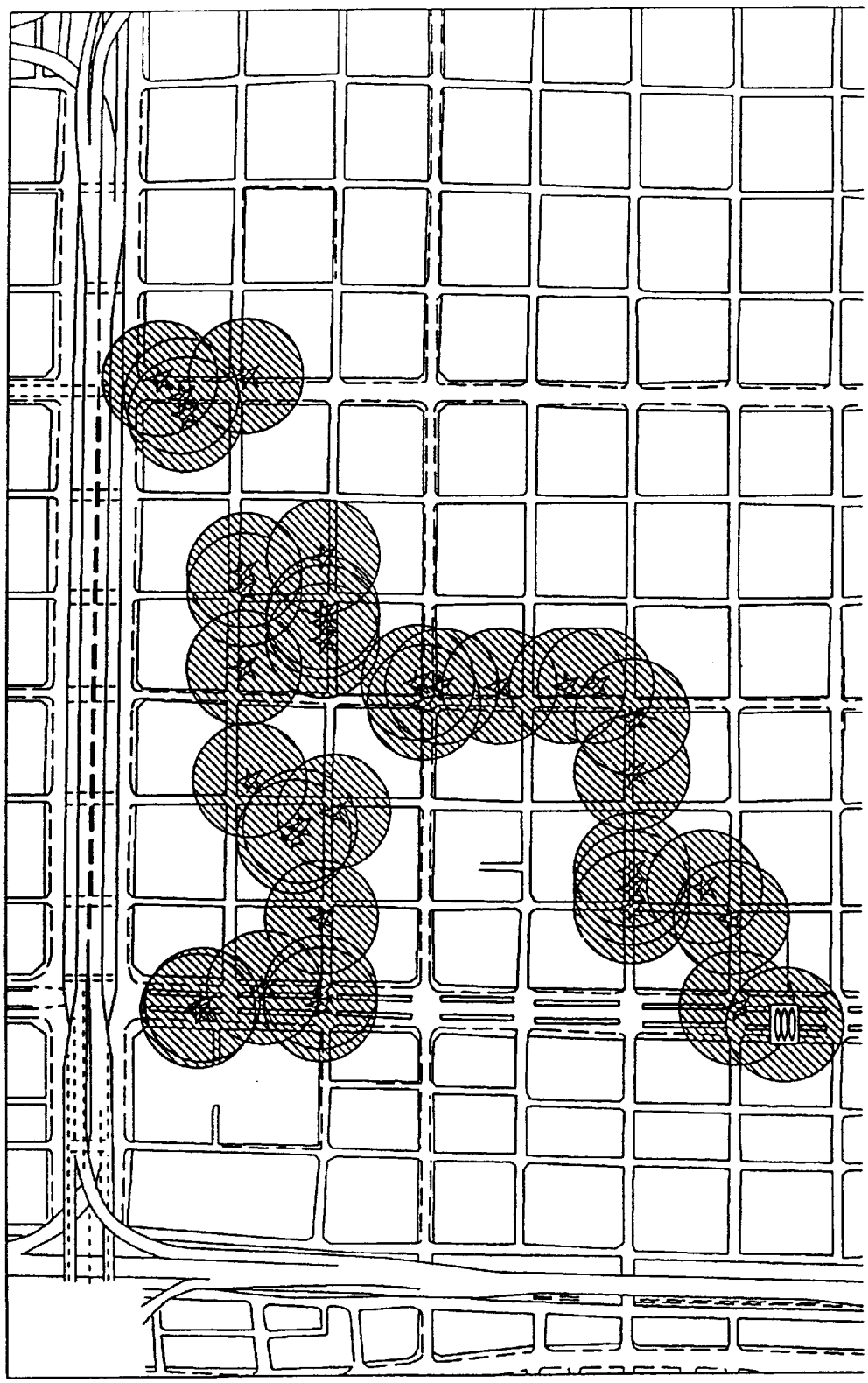
FIG. 20 shows traces of a mobile terminal at different time points.

Next, a case where a plurality of positions of mobile station 7 obtained at different time points will be described with reference to FIG. 20. The locus of the movement of mobile station 7 can be obtained to trace mobile station 7 in real time.

The present invention is not limited to the above embodiment in which a three dimensional map is used. A wave propagation pattern can similarly be produced and used even with a normal plan map as long as the configuration of buildings and facilities can be identified.

Although the present invention can be applied in various fields, it is particularly effective in retaining the position information of respective vehicles for a delivery service organization. Position information can be collected with no burden on the driver. Furthermore, the driver will not be disturbed by the ringing bell of the telephone. The center can grasps the position of the delivery vehicles while the driver is completely unaware. Therefore, collection and delivery of an item can be carried out speedily at the request of a customer of the delivery service organization. Furthermore, the search and confirmation of a missing object can also be carried out speedily.

As an alternative application, the location of a salesman whether in a vehicle or walking around can be displayed on a map of the display of the employer. Communication and also management of the salesman can be carried out more effectively.

The present invention can also be used to display the position of a police patrol car. An exclusive terminal of the present invention can be carried or mounted in a bank transport truck or vehicle of a bank or a security service company. By incorporating an exclusive terminal into the case where money is packed, the position of the case or vehicle carrying the money can always be monitored by center station 1 or 75. By the pressing an emergency button that emits an emergency signal from exclusive mobile station 7 when a trouble occurs, an emergency interrupt state can be imposed on display of center station 1 or 75 to notify the operator of center station 1 or 75 that an emergency situation has occurred by providing the marker indicating the repeater closest to the relevant vehicle in a blinking manner. The operator can immediately notify the police to facilitate a speedy solution of the trouble.

The advantage that the exclusive terminal of the present invention can be reduced in size, weight and cost allows a mobile station 7 of a size of a cigarette package to be carried by an infant, or an individual of senile dementia, or one that is mentally or physically handicapped, so that the position of mobile station 7, i.e. the individual carrying the terminal of the present invention, can be traced by displaying a map information on a domestic personal computer and the like. The person carrying the terminal of the present invention can be explicitly identified to be within a circle area of approximately 100 m in radius according to the position information. Since the location of the individual can be monitored at domestic facilities, it is effective from the aspect of safety and protection. Furthermore, when the individual carrying the terminal of the present invention wants to contact anyone at home urgently, depression of the emergency button will cause a blinking display of the marker indicating repeater 6 on the monitor of a domestic personal computer or the like. The emergency can be notified at once to take the individual under protection at a relatively earlier period.

The terminal of the present invention can also be attached to the collar of a pet. When the pet strays off, it can be located rather easily since its location can be determined.

The repeater of PHS covers a range of a circle area of 100 m in radius in cities and towns. From the standpoint of economy, a coverage area of 2–3 km in radius for one repeater is planned for the outskirts of the city. Although it may seem that identification of the position of mobile station 7 is more difficult at suburbs than in towns, location in the range of approximately 2–3 km in radius may be sufficient since the number of facilities or residents at the suburbs is small. A compromise must be made taking into consideration cost effectiveness.

Although the operation of the present invention is described according to the PHS, the present invention can basically be applied to any system as long as it is a small zone wireless communication system.

(D) Fourth Embodiment

Figure 21:
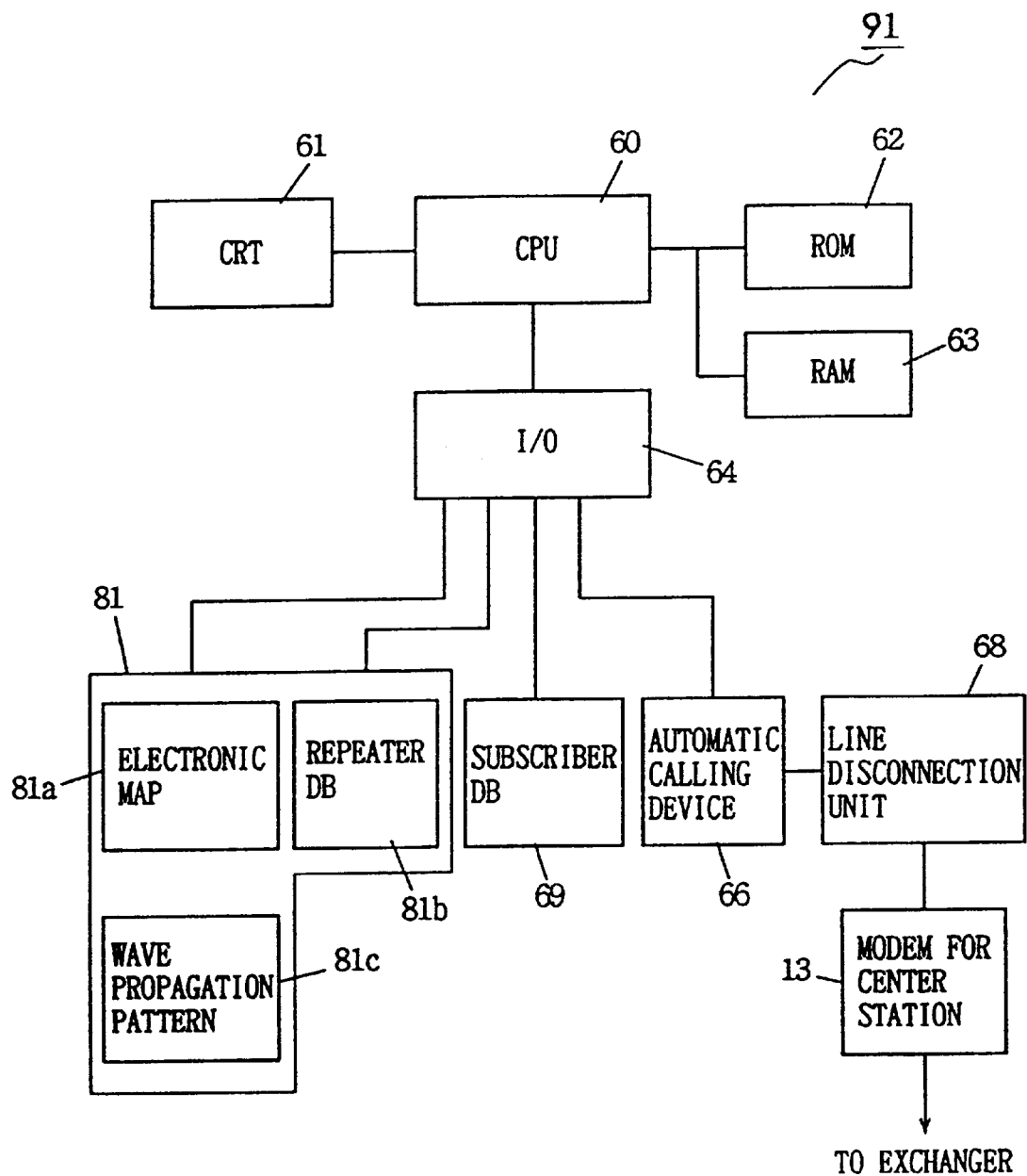
FIG. 21 is a block diagram showing a structure of the center station of a position determining system according to the present invention.

FIG. 21 is a block diagram of center station 1 which is the position determining system according to the present invention. In contrast to the first embodiment shown in FIG. 1, center station 1 of the present embodiment differs in that a wave propagation pattern database 81 is provided wherein an electronic map 81a, a repeater database 81b, and a normalization pattern database 81 in which normalized wave propagation patterns that will be described afterwards are stored are included in an integral manner. The remaining elements are similar to those of the first embodiment. Corresponding components have the same reference characters allotted, and their description will not be repeated.

(1) Definition of Repeter Wave Propagation Pattern Data

How repeater 6 obtains the wave propagation pattern of a repeater will be described hereinafter.

Figure 22:
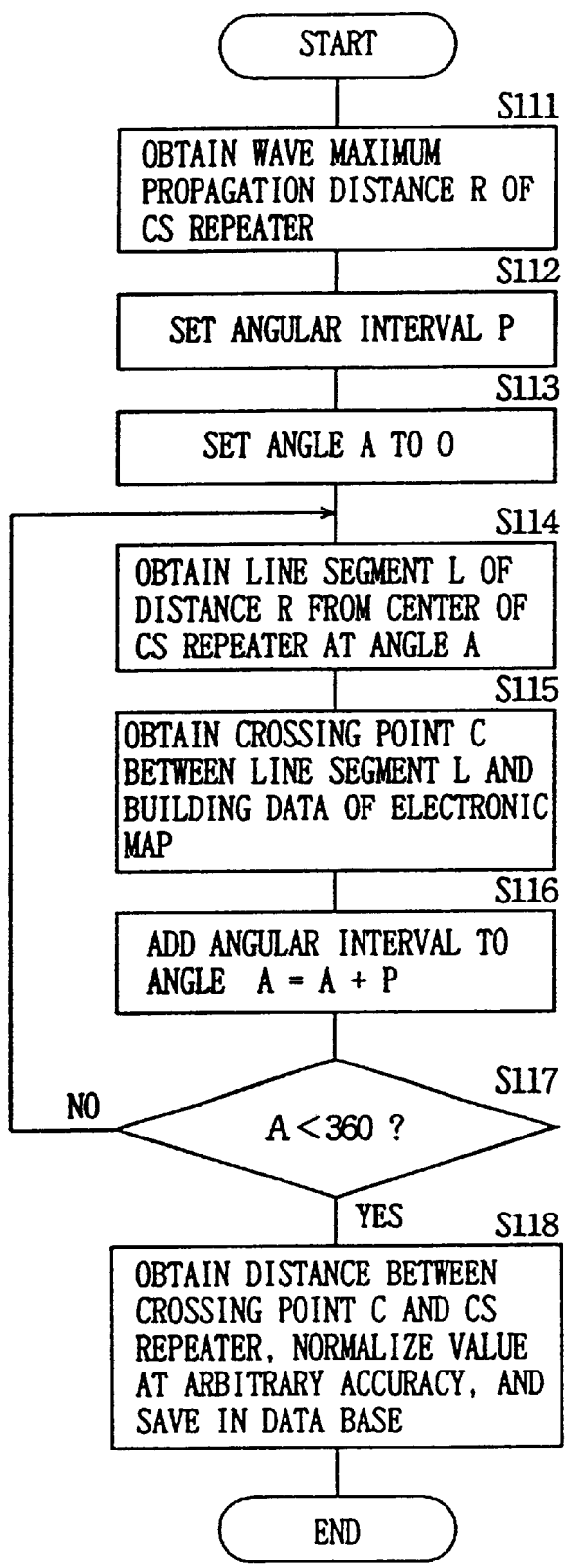
FIG. 22 is a flow chart showing the procedure for obtaining a wave propagation pattern of a repeater.
Figure 23:
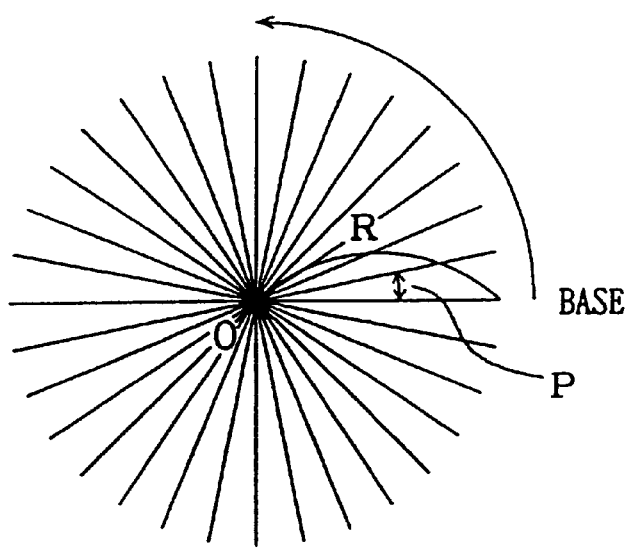
FIGS. 23 and 24 show specific operations for obtaining a wave propagation wave of a repeater.
Figure 24:
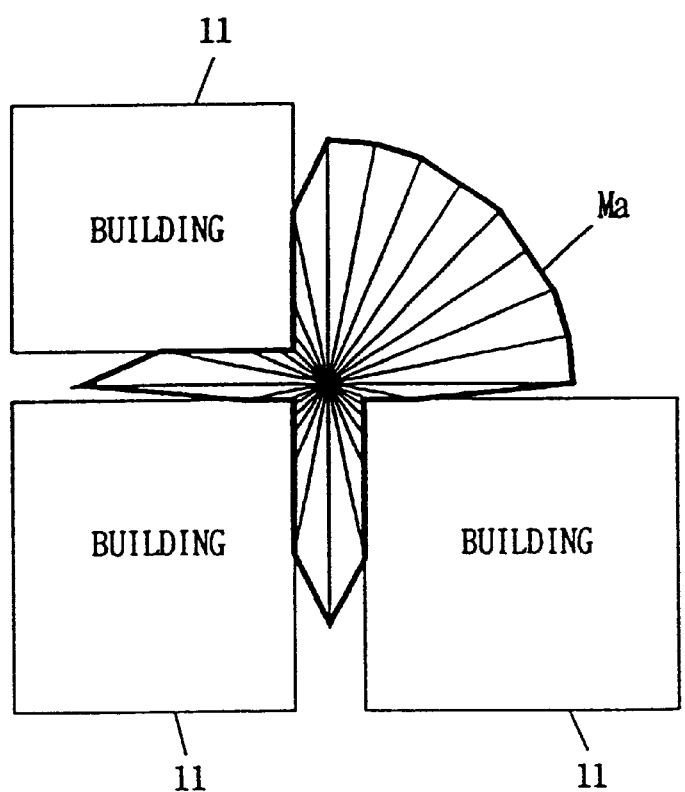

FIG. 22 is a flow chart for obtaining the wave propagation pattern of repeater 6. FIGS. 23 and 24 are schematic diagrams for showing the procedure of obtaining the wave propagation pattern of repeater 6. First, the wave maximum propagation distance R of repeater 6 is obtained using actually measured values (step S11). A line segment connecting center point 0 of repeater 6 and points on the wave maximum propagation distance R is obtained as shown in FIG. 22. In this case, line segments are obtained connecting points at equal angular intervals with the horizontal direction (angle A=0) as the base in a counter clockwise manner. Here, an arbitrary angle within the range of 1–120° is selected for the angular interval (S112–S114).

Next, the crossing point between line segment L representing distance R and building data 11 on the electric map is obtained to generate a region (polygon) enclosed by the crossing points. For example, when repeater 6 is located at the center of the crossing point, and when there are buildings at three corners, a region as shown in FIG. 24 is automatically obtained as wave propagation pattern Ma (S11–S117).

A train of coordinate points of the obtained wave propagation pattern Ma is converted into the value of distance from the center of repeater 6. This distance value is stored in database 81 (S118). Here, the distance is saved as a value normalized to an arbitrary accuracy. For example, if the wave maximum propagation distance is 800 m, and the accuracy is 4 m, the value is normalized and saved as 800/4=200. Since a value converted into such a normalized value is stored, the time required for retrieval can be reduced since the data length of the wave propagation pattern is reduced.

FIG. 25 shows the relationship between the accuracy and the distance range per 1 byte. FIG. 6 shows the relationship between the angular interval of the train of coordinate points of the wave propagation pattern and the data length (when the distance is represented by 1 byte). When the angular interval of the train of coordinate points is set to 5° with an accuracy of 4 m, the wave propagation pattern of repeater 6 is expressed as follows when defined with the train of coordinate points (floating point of 8 bytes). More specifically, 8×2=16 bytes with 8 bytes for each of X and Y coordinates. With the angular interval of 5°, 360/5=72. 16×72=1152 bytes. Only 72 bytes is required for definition from the center of repeater 6 as in the fourth embodiment. The wave propagation pattern of repeater 6 can be defined by 1/16. Representation of the wave propagation pattern of repeater 6 with small data means that the data registered in the database is also reduced. The time for retrieval can be reduced in searching for the wave propagation pattern of an arbitrary repeater 6 from database 81.

Figure 27:
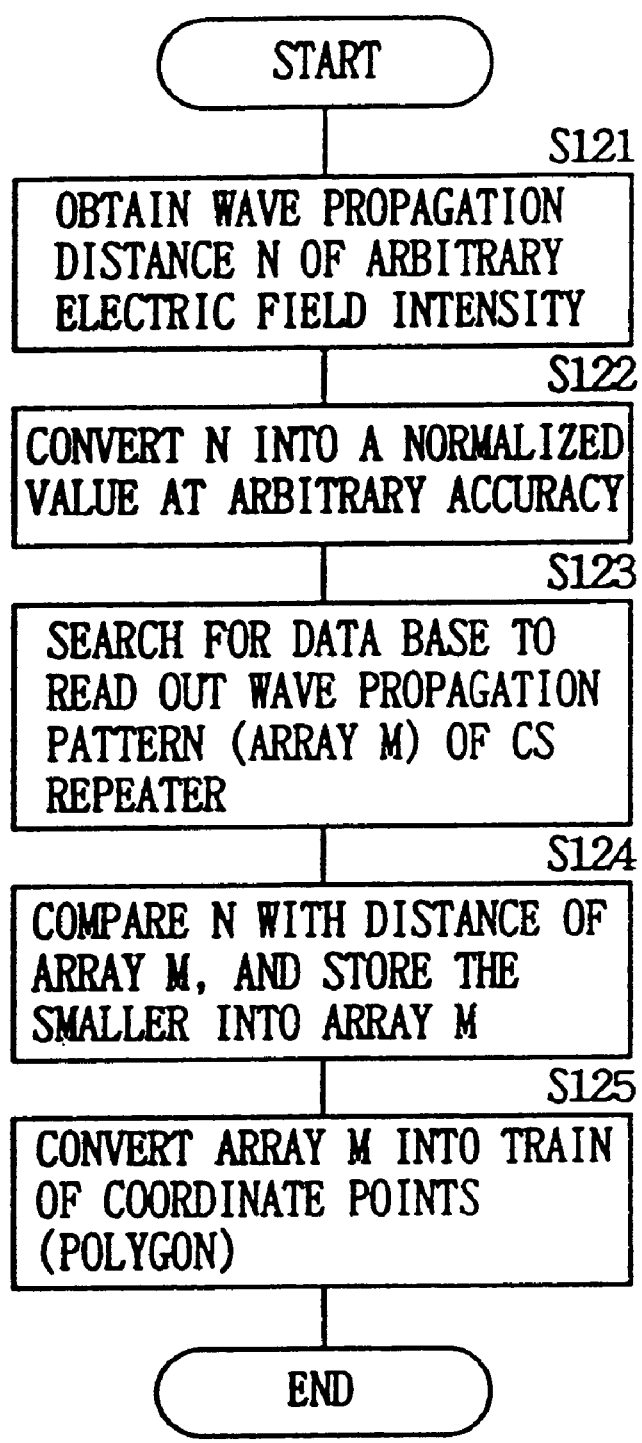
FIG. 27 is a flow chart showing the procedure of calculating a wave propagation pattern of an arbitrary electric field intensity.
Figure 28:
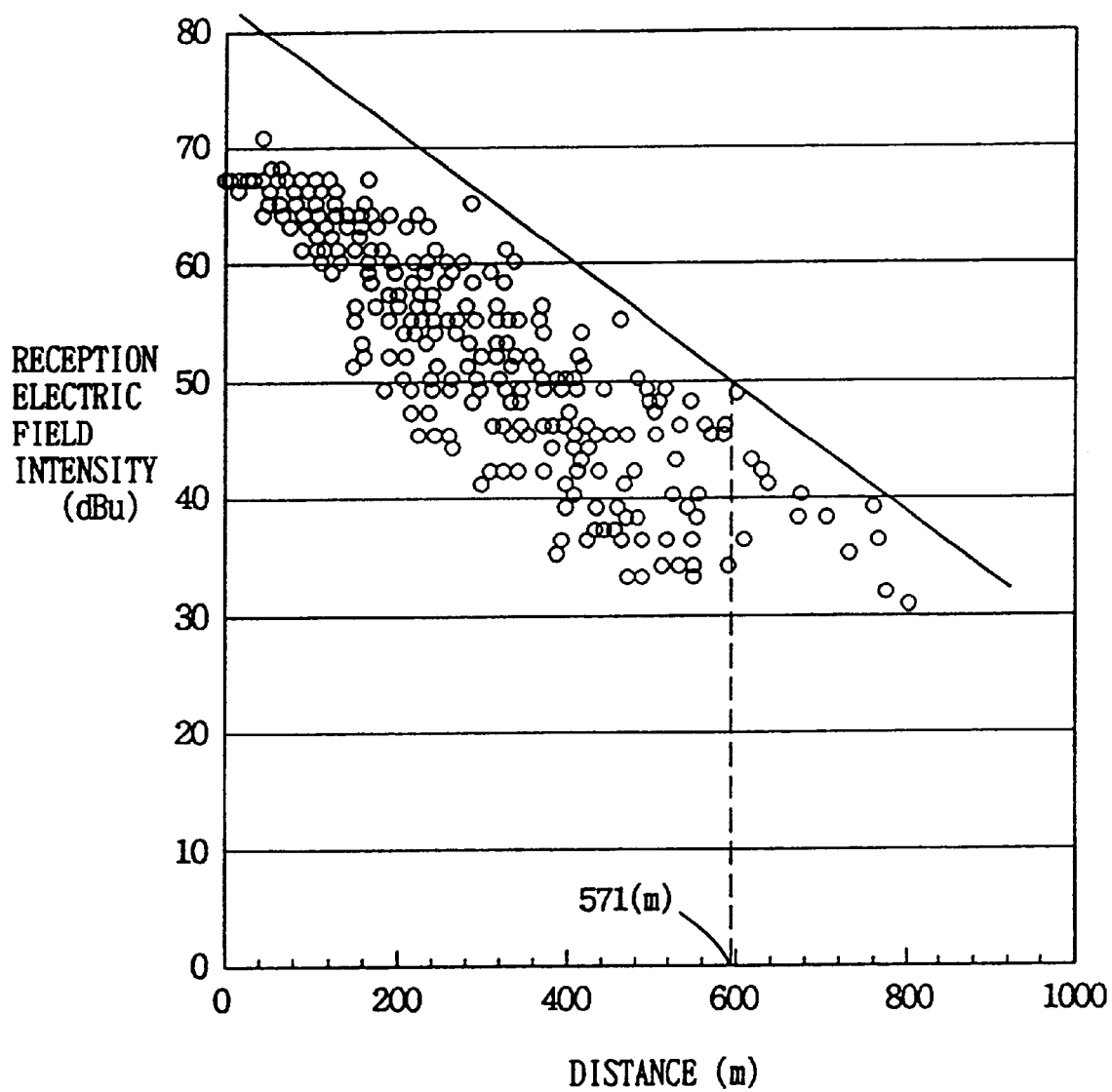
FIG. 28 shows measured value data of electric field intensity and distance.

(2) Calculation of a Wave Propagation Pattern of an Arbitrary Electrical Field Intensity FIG. 27 is a flow chart showing the procedure for such calculation. FIG. 28 shows the relationship between the electric field intensity and wave propagation distance. FIG. 29 shows the specific operation.

First, wave propagation distance N of an arbitrary electric field intensity is obtained according to an experimental equation extracted from actually measured values (S121).

Referring to FIG. 28, the relationship between the electric field intensity and the wave maximum propagation distance according to various measured results is obtained. For example, the following equation is obtained from FIG. 28.

Propagation distance N=−(electric field intensity−82)/0.056.

The wave propagation distance is obtained according to this equation. This propagation distance is normalized according to the accuracy of the wave propagation pattern Ma of repeater 6 stored in the database (S122). If the detected wave propagation distance is 400 m and the accuracy is 4 m, 400/4=100.

Figure 29A:
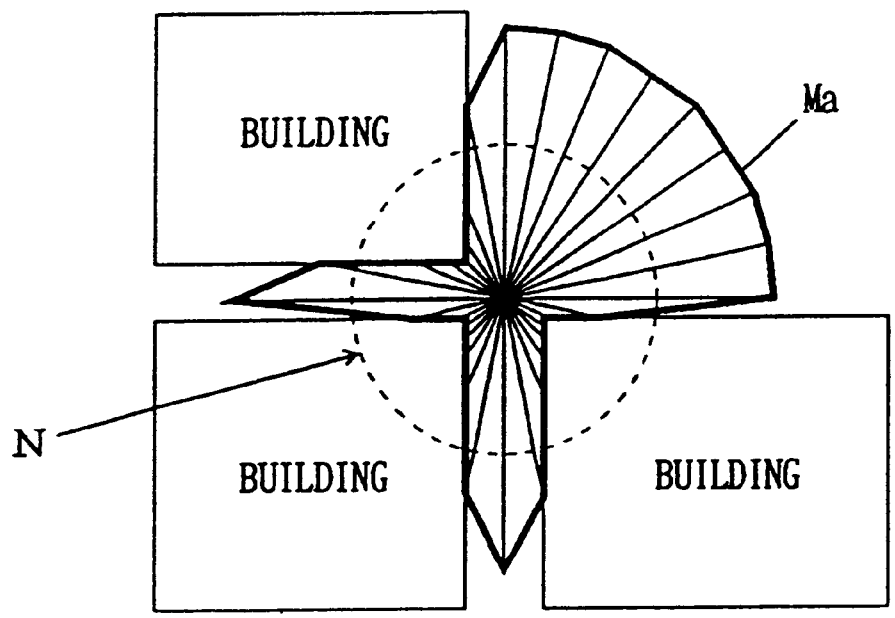
FIGS. 29*a* and 29*b* show specific operations for calculating a wave propagation pattern of an arbitrary electric field intensity.
Figure 29B:
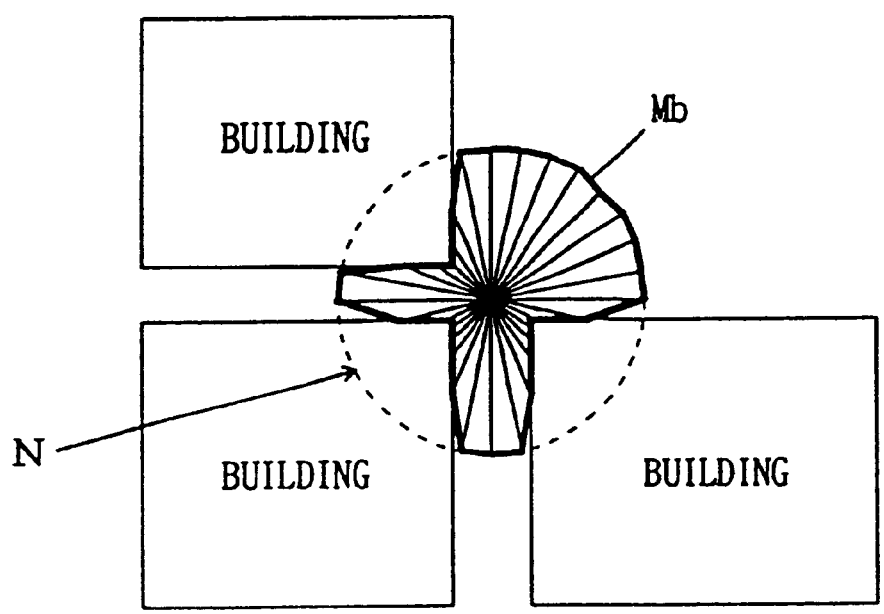

Database 81 is searched for to read out the wave propagation pattern of repeater 6 (S123). The wave propagation distance N of an arbitrary electric field intensity (100 in the above example) is compared with distance R of the wave propagation pattern Ma of a repeater 6 (200 in the above example). When the distance of the wave propagation pattern of repeater 6 is greater, it is substituted with wave propagation distance Mb of an arbitrary electric field intensity (S124). Since distance R of the wave propagation pattern Ma of repeater 6 is the maximum propagation distance, wave propagation distance N will not become greater than distance R. Therefore, calculation of the wave propagation pattern of an arbitrary electric field intensity is possible by just comparing the numeric values. FIG. 29a shows the wave propagation pattern Ma registered in the database, and FIG. 29b shows the wave propagation pattern of an arbitrary electric field intensity.

Thus, the wave propagation pattern of an arbitrary electric field intensity can be obtained by just comparing the distance of wave propagation pattern Ma of repeater 6 stored in database 81 with distance N of an arbitrary electric field intensity. The crossing point with the building data on the electric map does not have to be obtained every time.

Therefore, the time required for calculating the wave propagation pattern of an arbitrary electric field intensity can be reduced.

(3) Calculation of Overlap of Wave Propagation Pattern

Figure 30:
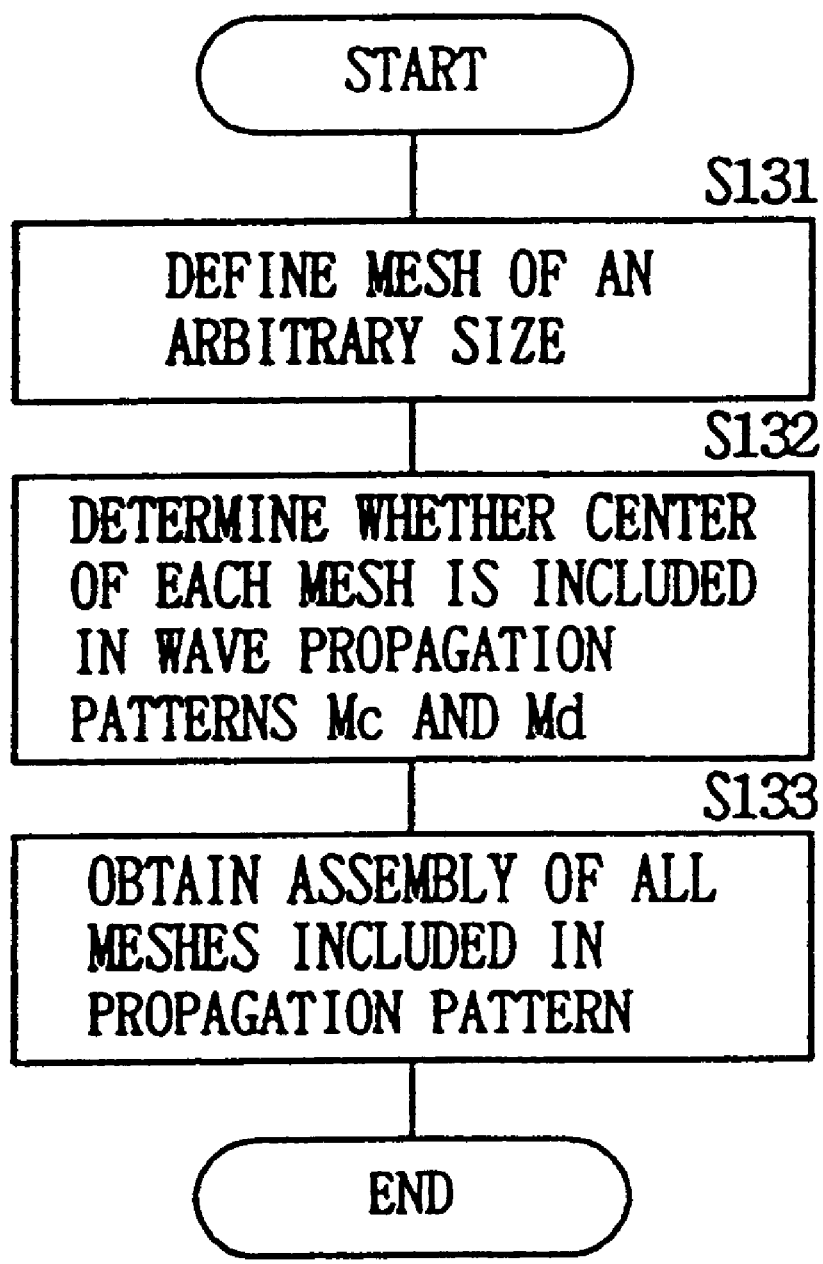
FIG. 30 is a flow chart for obtaining an overlap of wave propagation patterns..
Figure 31:
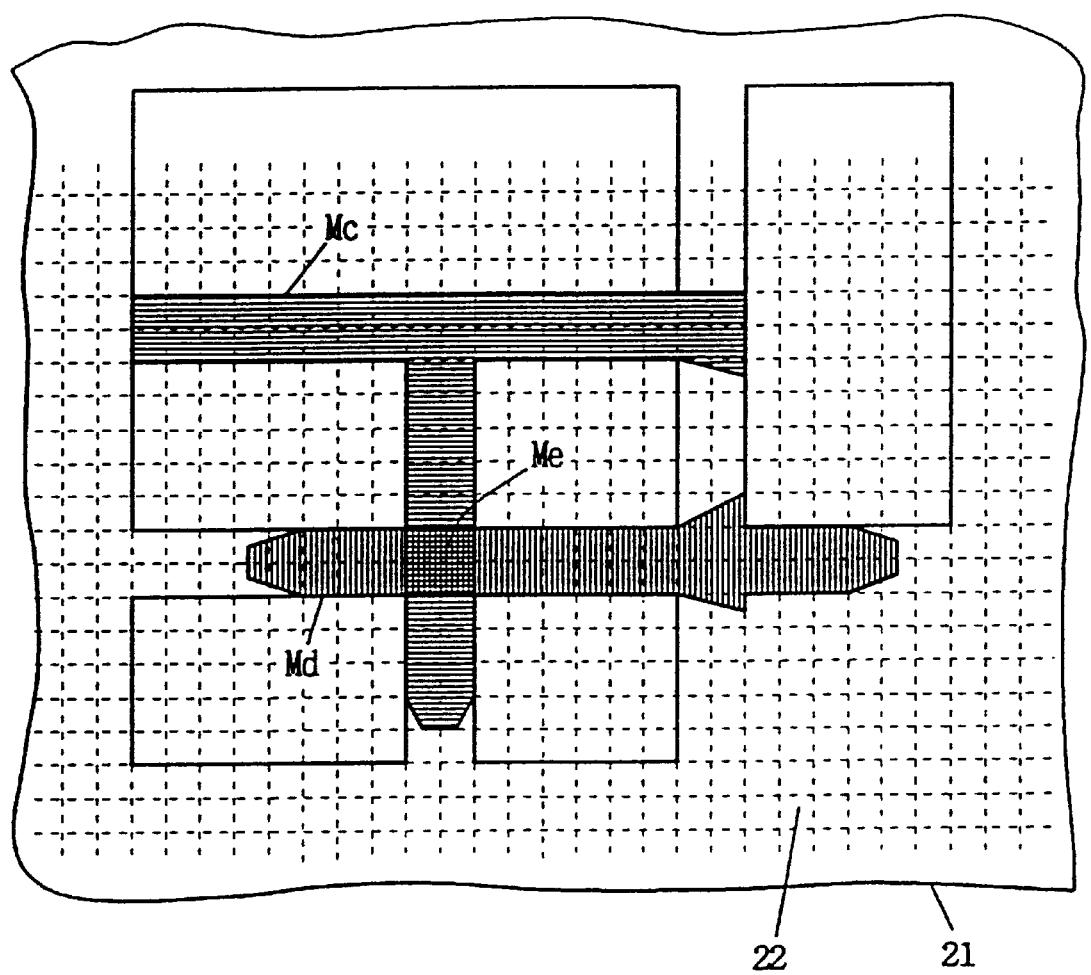
FIG. 31 shows a specific operation for obtaining an overlap of wave propagation patterns.

Calculation of the overlap of the wave propagation patterns described in (2) will be described hereinafter with reference to FIGS. 30 and 31. FIG. 30 is a flow chart showing the procedure for calculating the overlap of the wave propagation patterns. FIG. 31 shows the specific operation.

First, a mesh 22 of an arbitrary size according to accuracy is virtually defined within the range including wave propagation patterns Mc and Md of which the overlap on a predetermined map 21 is to be obtained (S131). Determination is made whether the center of each mesh 22 is included in wave propagation patterns Mc and Md (S132). An assembly of the meshes included in wave propagation patterns Mc and Md is set as the overlap of the wave propagation patterns (S133). The calculation time can be reduced since the overlap is obtained by calculation of a polygon and a point, not between polygons.

FIG. 31 shows the specific operation of obtaining the overlap. First, one propagation pattern Mc is defined by one polygon, and then wave propagation pattern Md is obtained using the other polygon. The position can be determined by obtaining the overlapping portion Me.

Here, the size of the mesh that is virtually defined can be increased (low accuracy) or reduced (high accuracy) A lower accuracy allows the time required for calculation to be reduced since the number of times for determining whether the center of the mesh is surrounded by the polygon or not is reduced.

INDUSTRIAL APPLICABILITY

By mounting, attaching, or carrying the mobile station which is a structural element of the system of the present invention, position information of a vehicle or an individual can be transmitted to a center station via an exchange station of the PHS. The position (location) of the vehicle or individual can be provided on the map information displayed on a display of the center station in a circle area drawn with respective markers as the center point (a circle area of approximately 100 m in radius in towns, and a circle area of approximately 2–3 km in radius in the outskirts). Therefore, the location of a vehicle or an individual can be identified at a glance. Furthermore, the present invention is suitable for managing and analyzing the movement of the mobile station since the locus of the movement thereof can be displayed together with the time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A position display system of a mobile terminal employing a small zone communication system, said small zone communication system comprising:

a repeater provided in each of a plurality of small zones, said repeater providing information identifying said repeater to said mobile terminal at the time of communication with said mobile terminal, a mobile terminal for carrying out communication with said repeater as a base, and a center station that can communicate with said mobile terminal, wherein said center station comprises detection means for detecting a position of said mobile terminal according to said repeater identify information, said mobile terminal comprises monitor means for monitoring electric field intensity of said repeater, and means for transmitting said repeater electric field intensity monitored by said monitor means to said center station, said detection means identifies the position of said mobile terminal according to said transmitted repeater electric field intensity and wave propagation pattern information according to the position of said repeater, said center station comprising:

storage means, wherein said detection means detects a position of said mobile terminal for a plurality of times at different time points, wherein results of said detected position of a plurality of times are stored in said storage means, and results of said detected position of a plurality of times are provided as a display of a trace of travel of said mobile terminal in said display means.

* * * * *